(12) United States Patent
Khoshnevisan et al.

(10) Patent No.: US 11,240,836 B2
(45) Date of Patent: Feb. 1, 2022

(54) MULTI-STATE REFERENCE SIGNALING AND SINGLE-STATE DATA TECHNIQUES

(71) Applicant: QUALCOMM Incorporated, San Diego, CA (US)

(72) Inventors: Mostafa Khoshnevisan, San Diego, CA (US); Tao Luo, San Diego, CA (US); Xiaoxia Zhang, San Diego, CA (US); Arumugam Chendamarai Kannan, San Diego, CA (US); Sungwoo Park, San Diego, CA (US)

(73) Assignee: Qualcomm Incorproated, San Diego, CA (US)

( * ) Notice: Subject to any disclaimer, the term of this patent is extended or adjusted under 35 U.S.C. 154(b) by 0 days.

(21) Appl. No.: 16/987,224

(22) Filed: Aug. 6, 2020

(65) Prior Publication Data

US 2021/0045148 A1 Feb. 11, 2021

Related U.S. Application Data

(60) Provisional application No. 62/884,575, filed on Aug. 8, 2019.

(51) Int. Cl.
*H04L 1/02* (2006.01)
*H04W 72/12* (2009.01)
(Continued)

(52) U.S. Cl.
CPC ....... *H04W 72/1289* (2013.01); *H04L 5/0023* (2013.01); *H04L 5/0048* (2013.01); *H04L 5/0057* (2013.01); *H04L 5/026* (2013.01)

(58) Field of Classification Search
CPC . H04L 1/0618; H04L 1/06; H04L 5/10; H04L 5/0051; H04W 52/146; H04W 52/225; H04W 52/242; H04W 72/042
(Continued)

(56) References Cited

U.S. PATENT DOCUMENTS 9,467,991 B2 * 10/2016 Seo .................. H04L 5/0048
2020/0287699 A1 * 9/2020 Su ..................... H04W 80/02
(Continued)

OTHER PUBLICATIONS

International Search Report and Written Opinion—PCT/US2020/045351—ISA/EPO—dated Nov. 18, 2020.
(Continued)

*Primary Examiner* — Khai Tran
(74) *Attorney, Agent, or Firm* — Patterson & Sheridan, L.L.P

(57) ABSTRACT

Certain aspects of the present disclosure provide techniques for making multi-transmission configuration indicator (TCI) state data scheduling more reliable. A method that may be performed by a user equipment (UE) includes receiving, from a base station (BS), a first signal indicative of a plurality of demodulation reference signal (DMRS) ports. The method may also include receiving, from the BS, a second signal indicative of a first spatial state of a physical channel and a second spatial state of the physical channel. The method may also include communicating data over the second subset and not the first subset, based on which of the plurality of DMRS ports are part of the first subset and which of the plurality of DMRS ports are part of the second subset.

30 Claims, 15 Drawing Sheets

(51) Int. Cl.
*H04L 5/00* (2006.01)
*H04L 5/02* (2006.01)

(58) Field of Classification Search
USPC .................................. 375/267, 130, 260
See application file for complete search history.

(56) References Cited

U.S. PATENT DOCUMENTS

| 2020/0313947 | A1* | 10/2020 | Noh | H04L 5/0082 |
| 2021/0022152 | A1* | 1/2021 | Yang | H04W 72/10 |
| 2021/0045148 | A1* | 2/2021 | Khoshnevisan | H04L 5/0094 |

OTHER PUBLICATIONS

Lenovo, et al., "Discussion of Multi-TRP/Panel Transmission", 3GPP Draft, R1-1906274, Multi-TRP Final, 3rd Generation Partnership Project (3GPP), Mobile Competence Centre, 650, Route Des Lucioles, F-06921 Sophia-Antipolis Cedex, France, vol. RAN WG1, No. Reno, USA, May 13, 2019-May 17, 2019, May 13, 2019 (May 13, 2019), XP051727726, 22 Pages, Retrieved from the Internet: URL: http://www.3gpp.org/ftp/Meetings%5F3GPP%5FSYNC/RAN1/Docs/R1%2D1906274%2Ezip. [retrieved on May 13, 2019].

NEC: "Discussion on Multi-TRP Transmission", 3GPP Draft, R1-1906400, 3rd Generation Partnership Project (3GPP), Mobile Competence Centre, 650, Route Des Lucioles, F-06921 Sophia-Antipolis Cedex, France, vol. RAN WG1, No. Reno, USA, May 13, 2019-May 17, 2019, May 13, 2019 (May 13, 2019), XP051727850, 3 pages, Retrieved from the Internet: URL: http://www.3gpp.org/ftp/Meetings%5F3GPP%5FSYNC/RAN1/Docs/R1%2D1906400%2Ezip. [retrieved on May 13, 2019] Text between Proposal 4 and Proposal 5.

* cited by examiner

```
TCI-State ::=           SEQUENCE {
        tci-StateId     TCI-StateId,
        qcl-Type1       QCL-Info,
        qcl-Type2       QCL-Info
        ...
}
```

FIG. 7A

```
QCL-Info ::=            SEQUENCE {
    cell                ServCellIndex
    bwp-Id              BWP-Id
    referenceSignal     CHOICE {
        csi-rs                  NZP-CSI-RS-ResourceId,
        ssb                     SSB-Index
    },
    qcl-Type            ENUMERATED {typeA, typeB, typeC, typeD},
    ...
}
```

FIG. 7B

MULTI-STATE REFERENCE SIGNALING AND SINGLE-STATE DATA TECHNIQUES

CROSS-REFERENCE TO RELATED APPLICATION(S)

This application claims benefit of and priority to U.S. Provisional Application No. 62/884,575, filed Aug. 8, 2019, which is hereby assigned to the assignee hereof and hereby expressly incorporated by reference herein in its entirety as if fully set forth below and for all applicable purposes.

TECHNICAL FIELD

Aspects of the technology discussed below relate generally to wireless communications, and more particularly, to techniques for determining channel quality for multiple transmission configuration indicator (TCI) states (e.g., before scheduling a downlink and/or an uplink communication).

INTRODUCTION

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR or NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

As the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects generally responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved techniques for improving data scheduling by determining channel quality for multiple transmission configuration indicator (TCI) states before scheduling a physical downlink and/or a physical uplink communication.

Certain aspects provide a method for wireless communication at a user equipment (UE). A method generally includes receiving, from a base station (BS), one or more signals. One signal may be a first signal indicative of a plurality of demodulation reference signal (DMRS) ports. A method may also include receiving, from the BS, a second signal indicative of a first spatial state of a physical channel and a second spatial state of the physical channel. The first spatial state can correspond to a first subset of the plurality of DMRS ports. The second spatial state can correspond to a second subset of the plurality of DMRS ports. A method may also include determining which of the plurality of DMRS ports are part of the first subset and which of the plurality of DMRS ports are part of the second subset. A method may also include communicating data over the second subset and not the first subset, based on which of the plurality of DMRS ports are part of the first subset and which of the plurality of DMRS ports are part of the second sub set.

Certain aspects provide a method of wireless communication at a BS. The method generally includes transmitting a number of signals, including a first signal and a second signal. A first signal can be indicative of a plurality of demodulation reference signal (DMRS) ports. A first subset of the plurality of DMRS ports can correspond to a first spatial state of a physical channel, and a second subset of the plurality of DMRS ports can correspond to a second spatial state of the physical channel. A method may also include transmitting a second signal indicative of the second subset of the plurality of DMRS ports. A method may also include communicating data over the second subset and not the first subset.

Certain aspects provide a user equipment (UE) comprising a memory and a processor communicatively coupled to the memory. In an example, the processor is configured to receive, from a base station (BS), a first signal indicative of a plurality of demodulation reference signal (DMRS) ports. In an example, the processor is configured to receive, from the BS, a second signal indicative of a first spatial state of a physical channel and a second spatial state of the physical channel, wherein the first spatial state corresponds to a first subset of the plurality of DMRS ports, and wherein the second spatial state corresponds to a second subset of the plurality of DMRS ports. In an example, the processor is configured to determine which of the plurality of DMRS ports are part of the first subset and which of the plurality of DMRS ports are part of the second subset. In an example, the processor is configured to communicate data over the second subset and not the first subset, based on which of the plurality of DMRS ports are part of the first subset and which of the plurality of DMRS ports are part of the second subset.

Certain aspects provide a base station comprising a memory and a processor communicatively coupled to the memory. In an example, the processor is configured to transmit a first signal indicative of a plurality of demodulation reference signal (DMRS) ports, wherein a first subset of the plurality of DMRS ports correspond to a first spatial state of a physical channel, and wherein a second subset of the plurality of DMRS ports correspond to a second spatial state of the physical channel. In an example, the processor is configured to transmit a second signal indicative of the second subset of the plurality of DMRS ports. In an example, the processor is configured to communicate data over the second subset and not the first subset.

Aspects of the present disclosure provide means for, apparatus, processors, and computer-readable mediums for performing one or more of the methods and/or techniques described herein.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

FIG. 7A illustrates an example transmission configuration indicator (TCI) state, in accordance with certain aspects of the present disclosure.

FIG. 7B illustrates an example of quasi co-location (QCL) information, in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
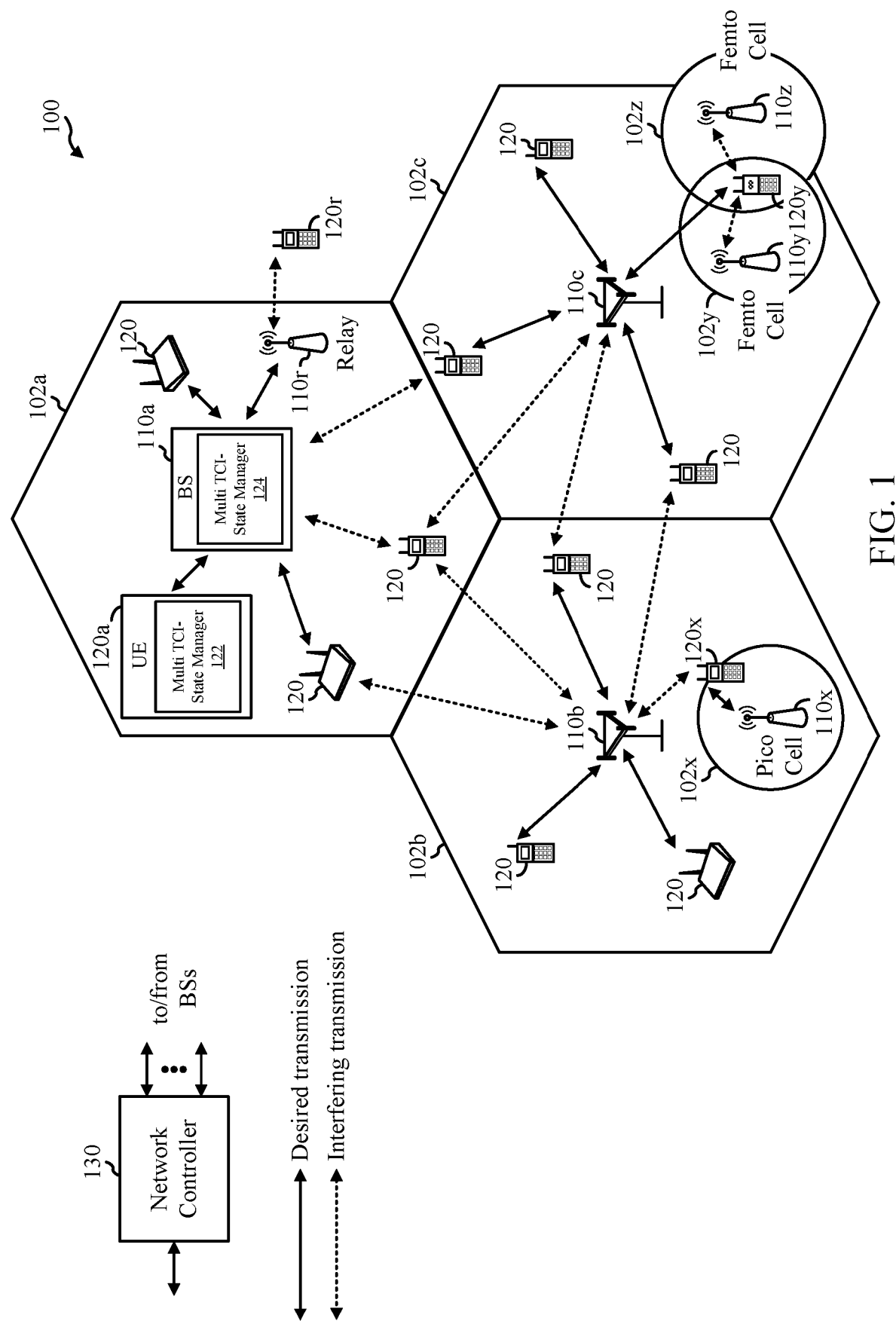
FIG. 1 is a block diagram conceptually illustrating an example telecommunications system, in accordance with certain aspects of the present disclosure.

Aspects of the present disclosure provide apparatus, devices, methods, processing systems, and computer readable mediums for improved techniques for making multi-transmission configuration indicator (TCI) state data scheduling more reliable. For example, based on feedback from a user equipment (UE), a base station (B S) can schedule ports in a variety of manners. In one example, port scheduling can involve scheduling a first subset of ports for data and a second subset of ports for demodulation reference signals. Here, of a plurality of ports, the first subset of ports may include one or more ports of the plurality of ports, and the second subset may include one or more other ports of the plurality of ports. Accordingly, a BS and/or a UE can determine the quality of multiple channels corresponding to multiple TCI states in the case that two or more of the TCI states are used for data.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

The following description provides examples of scheduling a physical downlink communication and/or a physical uplink communication. Some examples may use demodulation reference signals (DMRS) with one or more multi-TCI states. In some instances, data may be a single state, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. Any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, a 5G NR RAT network may be deployed.

FIG. 1 illustrates an example wireless communication network 100 in which aspects of the present disclosure may be performed. For example, the wireless communication network 100 may be an NR system (e.g., a 5G NR network).

As illustrated in FIG. 1, the wireless communication network 100 may include a number of base stations (BSs) 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. The BSs 110 communicate with UEs 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile.

According to certain aspects, the BSs 110 and UEs 120 may be configured for scheduling one or more DMRS ports. For example, a subset of one or more DMRS ports may be for data. And another subset of one or more DMRS ports for DMRS, and scheduling data and DMRS transmission for a multiple TCI-state communication for downlink and/or uplink communication based on channel quality. As shown in FIG. 1, the BS 110a includes a multi TCI-state manager 124. The multi TCI-state manager 124 may be configured to transmit a first signal indicative of a plurality of demodulation reference signal (DMRS) ports. A first subset of the plurality of DMRS ports can correspond to a first spatial state of a physical channel. A second subset of the plurality of DMRS ports can correspond to a second spatial state of the physical channel. The multi TCI-state manager 124 may also transmit a second signal indicative of the second subset of the plurality of DMRS ports. Additionally or alternatively, the multi TCI-state manager 124 may communicate data over the second subset and not the first subset, in accordance with some aspects of the present disclosure.

As shown in FIG. 1, the UE 120a includes a multi TCI-state manager 122. The multi TCI-state manager 122 may be configured to receive, from a BS, a first signal indicative of a plurality of DMRS ports, in accordance with aspects of the present disclosure. In some aspects, the multi TCI-state manager 122 may be configured to receive, from the BS, a second signal indicative of a first spatial state of a physical channel and a second spatial state of the physical channel, wherein the first spatial state corresponds to a first subset of the plurality of DMRS ports, and wherein the second spatial state corresponds to a second subset of the plurality of DMRS ports. In certain aspects, the multi TCI-state manager 122 may be configured to determine which of the plurality of DMRS ports are part of the first subset and which of the plurality of DMRS ports are part of the second subset. In certain aspects, the TCI-state manager 122 may be configured to communicate data over the second subset and not the first subset.

Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may couple to a set of BSs 110 and provide coordination and control for these BSs 110. The network controller 130 may communicate with the BSs 110 via a backhaul. The BSs 110 may also communicate with one another (e.g., directly or indirectly) via wireless or wireline backhaul.

Figure 2:
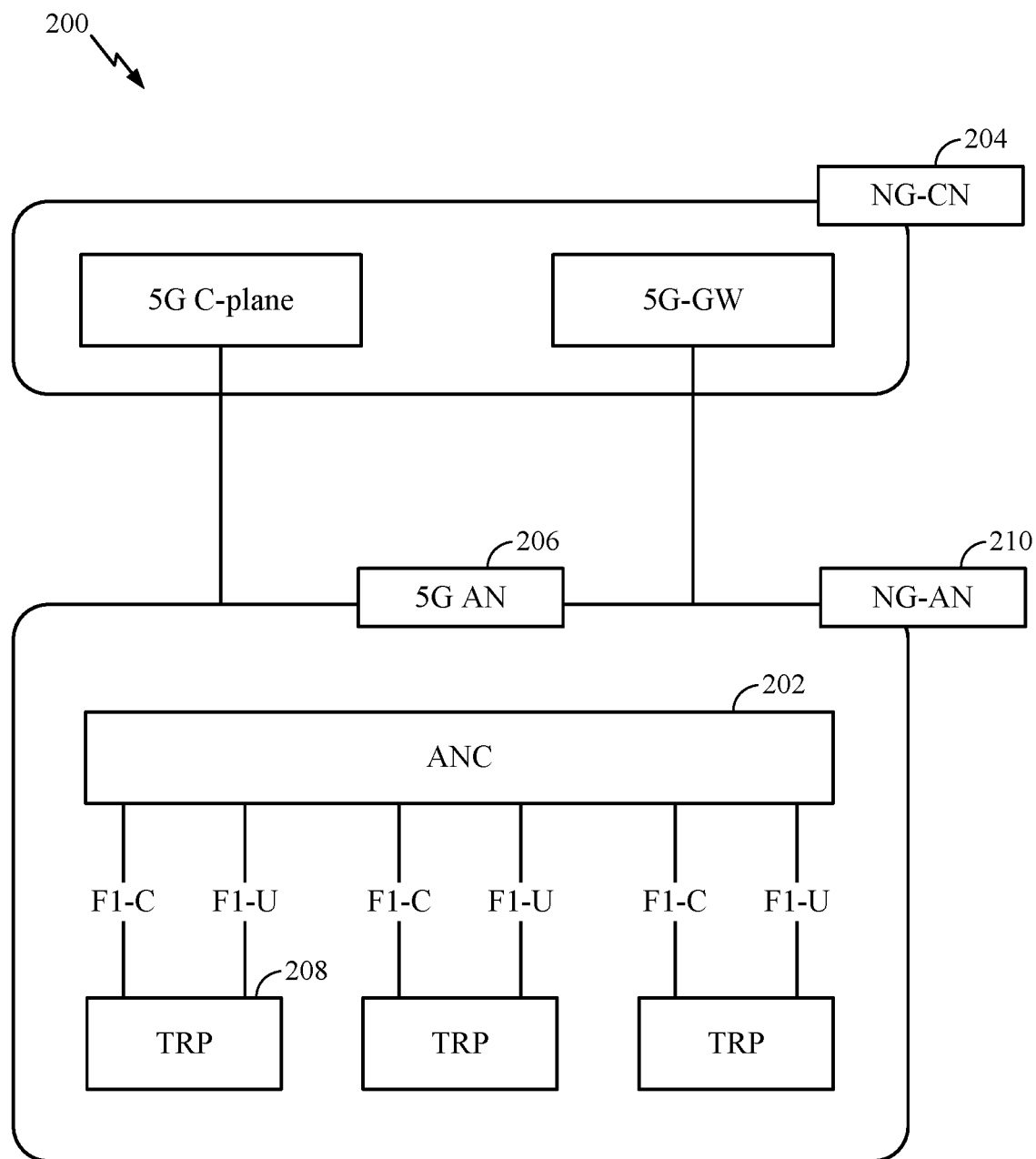
FIG. 2 is a block diagram illustrating an example logical architecture of a distributed radio access network (RAN), which may be implemented in the wireless communication network illustrated in FIG. 1 according to some aspects.

FIG. 2 is a block diagram illustrating an example logical architecture of a distributed radio access network (RAN)

200, which may be implemented in the wireless communication network 100 illustrated in FIG. 1. A 5G access node 206 may include an access node controller (ANC) 202. ANC 202 may be a central unit (CU) of the distributed RAN 200. The backhaul interface to the next generation core network (NG-CN) 204 may terminate at ANC 202. The backhaul interface to neighboring next generation access nodes (NG-ANs) 210 may terminate at ANC 202. ANC 202 may include one or more TRPs 208 (e.g., cells, BSs, gNBs, etc.).

The TRPs 208 may be a distributed unit (DU). TRPs 208 may be connected to a single ANC (e.g., ANC 202) or more than one ANC (not illustrated). For example, for RAN sharing, radio as a service (RaaS), and service specific ANC deployments, TRPs 208 may be connected to more than one ANC. TRPs 208 may each include one or more antenna ports. TRPs 208 may be configured to individually (e.g., dynamic selection) or jointly (e.g., joint transmission) serve traffic to a UE.

The logical architecture of distributed RAN 200 may support front-hauling solutions across different deployment types. For example, the logical architecture may be based on transmit network capabilities (e.g., bandwidth, latency, and/or jitter). The logical architecture of distributed RAN 200 may share features and/or components with LTE. For example, next generation access node (NG-AN) 210 may support dual connectivity with NR and may share a common front-haul for LTE and NR. The logical architecture of distributed RAN 200 may enable cooperation between and among TRPs 208, for example, within a TRP and/or across TRPs via ANC 202. An inter-TRP interface may not be used. Logical functions may be dynamically distributed in the logical architecture of distributed RAN 200. For example, a radio resource control (RRC) layer, a packet data convergence protocol (PDCP) layer, a radio link control (RLC) layer, a medium access control (MAC) layer, and a physical (PHY) layer may be adaptably placed at the TRP 208 or ANC 202.

Figure 3:
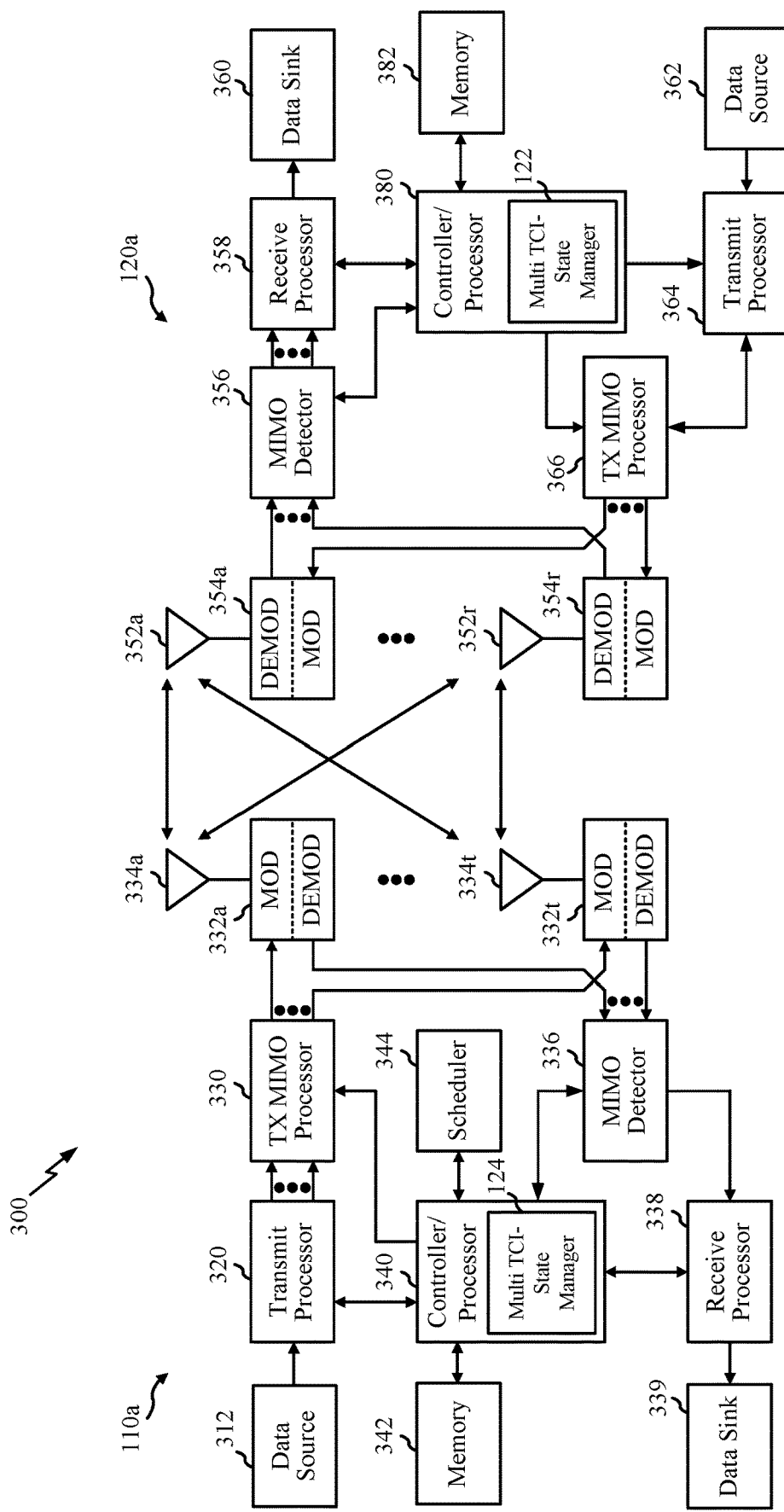
FIG. 3 is a block diagram conceptually illustrating a design of an example a base station (BS) and user equipment (UE), in accordance with certain aspects of the present disclosure.

FIG. 3 illustrates example components 300 of BS 110a and UE 120a (e.g., in the wireless communication network 100 of FIG. 1), which may be used to implement aspects of the present disclosure.

At the BS 110a, a transmit processor 320 may receive data from a data source 312 and control information from a controller/processor 340. The control information may be for the physical broadcast channel (PBCH), physical control format indicator channel (PCFICH), physical hybrid automatic repeat request (HARM) indicator channel (PHICH), physical downlink control channel (PDCCH), group common PDCCH (GC PDCCH), etc. The data may be for the physical downlink shared channel (PDSCH), etc. A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

The processor 320 may process (e.g., encode and symbol map) the data and control information to obtain data symbols and control symbols, respectively. The transmit processor 320 may also generate reference symbols, such as for the primary synchronization signal (PSS), secondary synchronization signal (SSS), and cell-specific reference signal (CRS). A transmit multiple-input multiple-output (MIMO) processor 330 may perform spatial processing (e.g., precoding) on the data symbols, the control symbols, and/or the reference symbols, if applicable, and may provide output symbol streams to the modulators (MODs) in transceivers 332a-332t. Each modulator in transceivers 332a-332t may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators in transceivers 332a-332t may be transmitted via the antennas 334a-334t, respectively.

At the UE 120a, the antennas 352a-352r may receive the downlink signals from the BS 110a and may provide received signals to the demodulators (DEMODs) in transceivers 354a-354r, respectively. Each demodulator in transceivers 354a-354r may condition (e.g., filter, amplify, downconvert, and digitize) a respective received signal to obtain input samples. Each demodulator may further process the input samples (e.g., for OFDM, etc.) to obtain received symbols. A MIMO detector 356 may obtain received symbols from all the demodulators in transceivers 354a-354r, perform MIMO detection on the received symbols if applicable, and provide detected symbols. A receive processor 358 may process (e.g., demodulate, de-interleave, and decode) the detected symbols, provide decoded data for the UE 120a to a data sink 360, and provide decoded control information to a controller/processor 380.

On the uplink, at UE 120a, a transmit processor 364 may receive and process data (e.g., for the physical uplink shared channel (PUSCH)) from a data source 362 and control information (e.g., for the physical uplink control channel (PUCCH) from the controller/processor 380. The transmit processor 364 may also generate reference symbols for a reference signal (e.g., for the sounding reference signal (SRS)). The symbols from the transmit processor 364 may be precoded by a transmit MIMO processor 366 if applicable, further processed by the modulators (MODs) in transceivers 354a-354r (e.g., for SC-FDM, etc.), and transmitted to the BS 110a. At the BS 110a, the uplink signals from the UE 120a may be received by the antennas 334, processed by the modulators in transceivers 332a-332t, detected by a MIMO detector 336 if applicable, and further processed by a receive processor 338 to obtain decoded data and control information sent by the UE 120a. The receive processor 338 may provide the decoded data to a data sink 339 and the decoded control information to the controller/processor 340.

The memories 342 and 382 may store data and program codes for BS 110a and UE 120a, respectively. A scheduler 344 may schedule UEs for data transmission on the downlink and/or uplink.

Antennas 252, processors 266, 258, 264, and/or controller/processor 280 of the UE 120a and/or antennas 234, processors 220, 230, 238, and/or controller/processor 240 of the BS 110a may be used to perform the various techniques and methods described herein. For example, as shown in FIG. 3, the controller/processor 340 of the BS 110a has a multi TCI-state manager 124 that may be configured for scheduling a subset of one or more DMRS ports for data and another subset of one or more DMRS ports for DMRS, and scheduling data and DMRS transmission for a multi TCI-state communication for downlink and/or uplink communication based on channel quality, according to aspects described herein. In some aspects, the multi TCI-state manager 124 may be configured to transmit a first signal indicative of a plurality of DMRS ports, wherein a first subset of the plurality of DMRS ports correspond to a first spatial state of a physical channel, and wherein a second subset of the plurality of DMRS ports correspond to a second spatial state of the physical channel. The multi TCI-state manager 124 may also be configured to transmit a second signal indicative of the second subset of the plurality of DMRS ports. The TCI-state manager 124 may also be configured to communicate data over the second subset and not the first subset, in accordance with aspects of the present disclosure.

As shown in FIG. 3, the controller/processor 380 of the UE 120*a* has multi TCI-state manager 122 that may be configured to receive, from a BS, a first signal indicative of a plurality of DMRS ports, in accordance with aspects of the present disclosure. In some aspects, the multi TCI-state manager 122 may be configured to receive, from the BS, a second signal indicative of a first spatial state of a physical channel and a second spatial state of the physical channel, wherein the first spatial state corresponds to a first subset of the plurality of DMRS ports, and wherein the second spatial state corresponds to a second subset of the plurality of DMRS ports. In certain aspects, the multi TCI-state manager 122 may be configured to determine which of the plurality of DMRS ports are part of the first subset and which of the plurality of DMRS ports are part of the second subset. In certain aspects, the multi TCI state manager 122 may be configured to communicate data over the second subset and not the first subset, according to aspects described herein. Although shown at the controller/processor, other components of the UE 120*a* and BS 110*a* may be used performing the operations described herein.

NR may utilize orthogonal frequency division multiplexing (OFDM) with a cyclic prefix (CP) on the uplink and downlink. NR may support half-duplex operation using time division duplexing (TDD). OFDM and single-carrier frequency division multiplexing (SC-FDM) partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, etc.).

Figure 4:
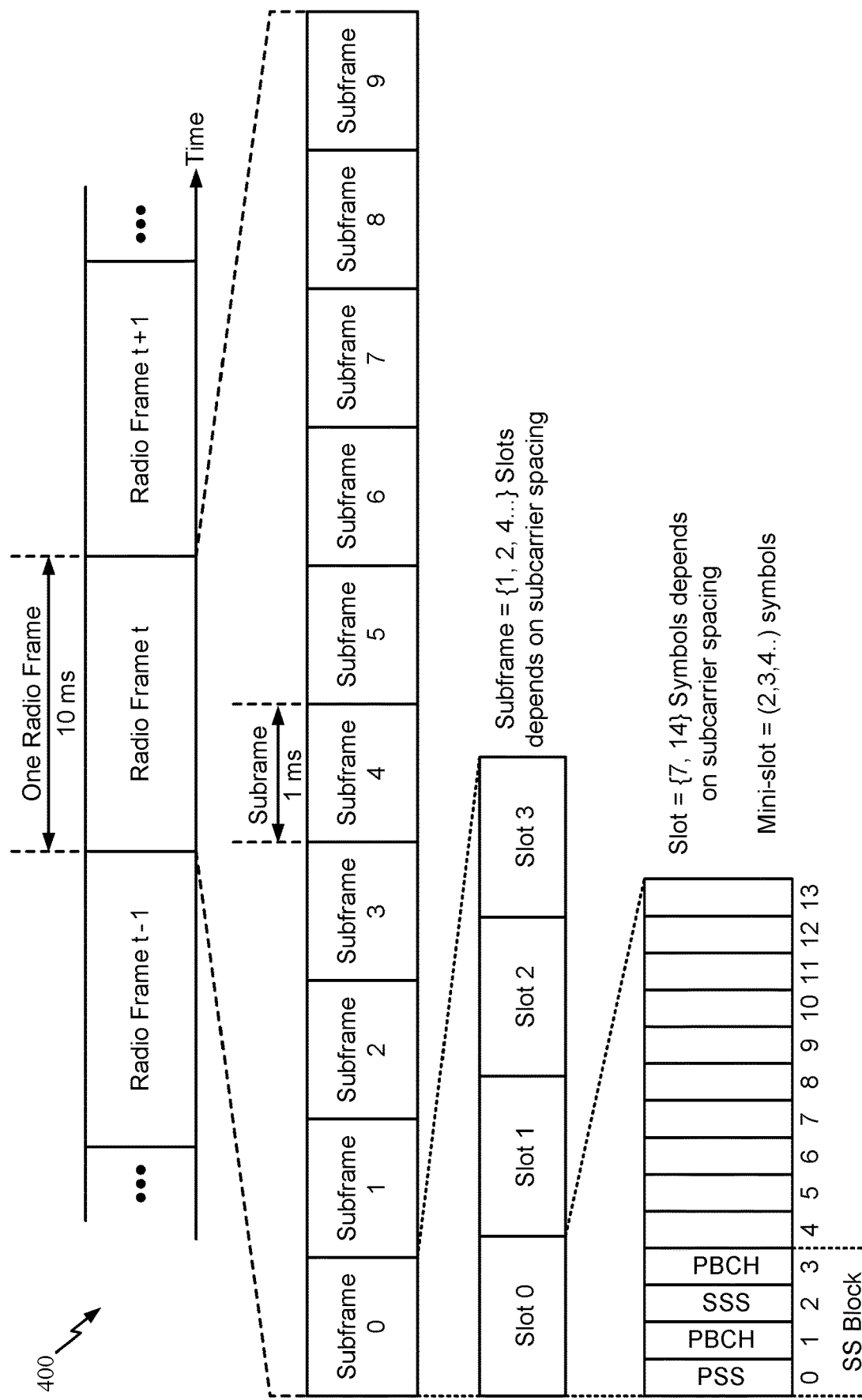
FIG. 4 is a diagram showing an example of a frame format for NR, in accordance with certain aspects of the present disclosure.

FIG. 4 is a diagram showing an example of a frame format 400 for NR. The transmission timeline for each of a downlink and an uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot is a subslot structure (e.g., 2, 3, or 4 symbols).

In NR, a synchronization signal (SS) block (SSB) is transmitted. The SS block can generally include a PSS, a SSS, and a two symbol PBCH. The SS block can be transmitted in a fixed slot location, such as the symbols 0-3 as shown in FIG. 6. The PSS and SSS may be used by UEs for cell search and acquisition. The PSS may provide half-frame timing, and the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes.

As described in more detail below with reference to FIGS. 5A and 5B, one or more symbols in a slot may indicate directional information. For example, in some instances, a symbol may indicate a link direction (e.g., DL, UL, or flexible) for data transmission. In some scenarios, link directions for one or more subframes may be dynamically switched. Link directions may be based on slot format. Each slot may include DL/UL data as well as DL/UL control information. Additional directional features are discussed below.

Figure 5A:
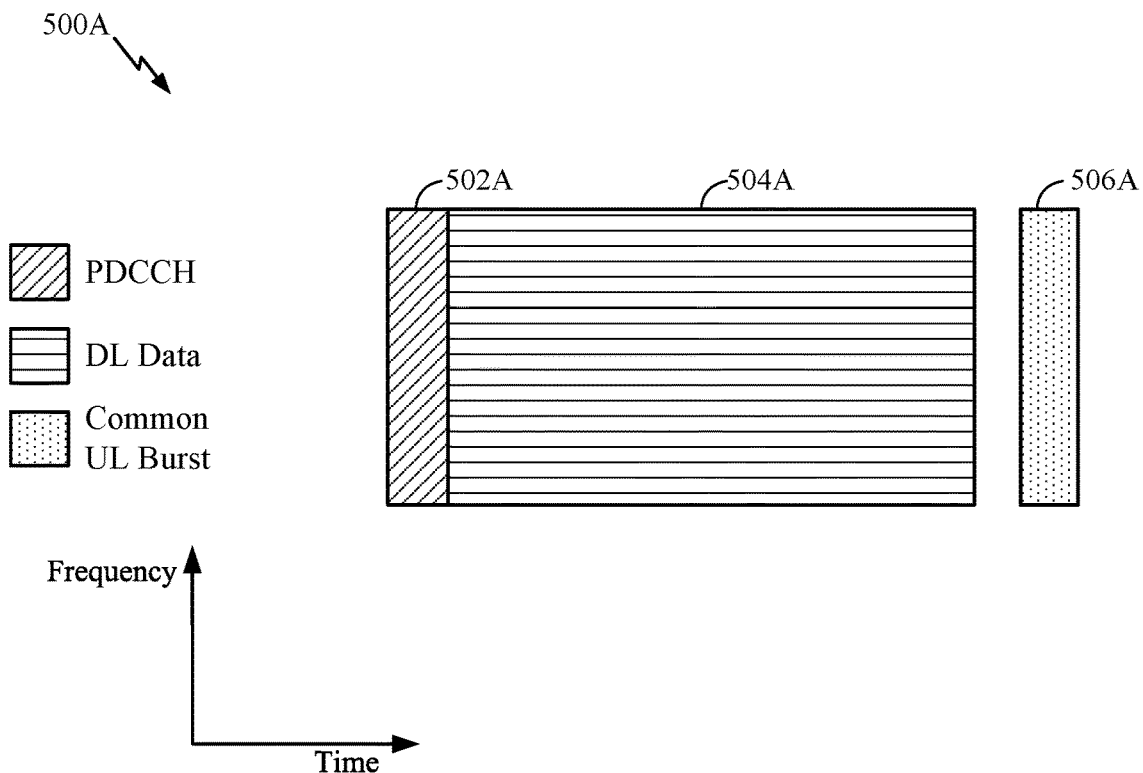
FIG. 5A is a block diagram illustrating an example of a DL-centric subframe, in accordance with certain aspects of the present disclosure.

FIG. 5A is a diagram 500A showing an example of a DL-centric subframe. The DL-centric subframe may include a control portion 502A. The control portion 502A may exist in the initial or beginning portion of the DL-centric subframe. The control portion 502A may include various scheduling information and/or control information corresponding to various portions of the DL-centric subframe. In some configurations, the control portion 502A may be a physical DL control channel (PDCCH), as indicated in FIG. 5A. The DL-centric subframe may also include a DL data portion 504A. The DL data portion 504A may sometimes be referred to as the payload of the DL-centric subframe. The DL data portion 504A may include the communication resources utilized to communicate DL data from the scheduling entity (e.g., UE or BS) to the subordinate entity (e.g., UE). In some configurations, the DL data portion 504A may be a physical DL shared channel (PDSCH).

The DL-centric subframe may also include a common uplink (UL) portion 506A. The common UL portion 506A may sometimes be referred to as an UL burst, a common UL burst, and/or various other suitable terms. The common UL portion 506A may include feedback information corresponding to various other portions of the DL-centric subframe. For example, the common UL portion 506A may include feedback information corresponding to the control portion 502A. Non-limiting examples of feedback information may include an acknowledgement (ACK) signal, a negative acknowledgment (NACK) signal, a HARQ indicator, and/or various other suitable types of information. HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission confirmed, an ACK may be transmitted, whereas if not confirmed, a NACK may be transmitted. In response to a NACK, the transmitting device may send a HARQ retransmission, which may implement chase combining, incremental redundancy, etc.

The common UL portion 506A may include additional or alternative information, such as information pertaining to random access channel (RACH) procedures, scheduling requests (SRs), and various other suitable types of information. As illustrated in FIG. 5A, the end of the downlink (DL) data portion 504A may be separated in time from the beginning of the common UL portion 506A. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 5B:
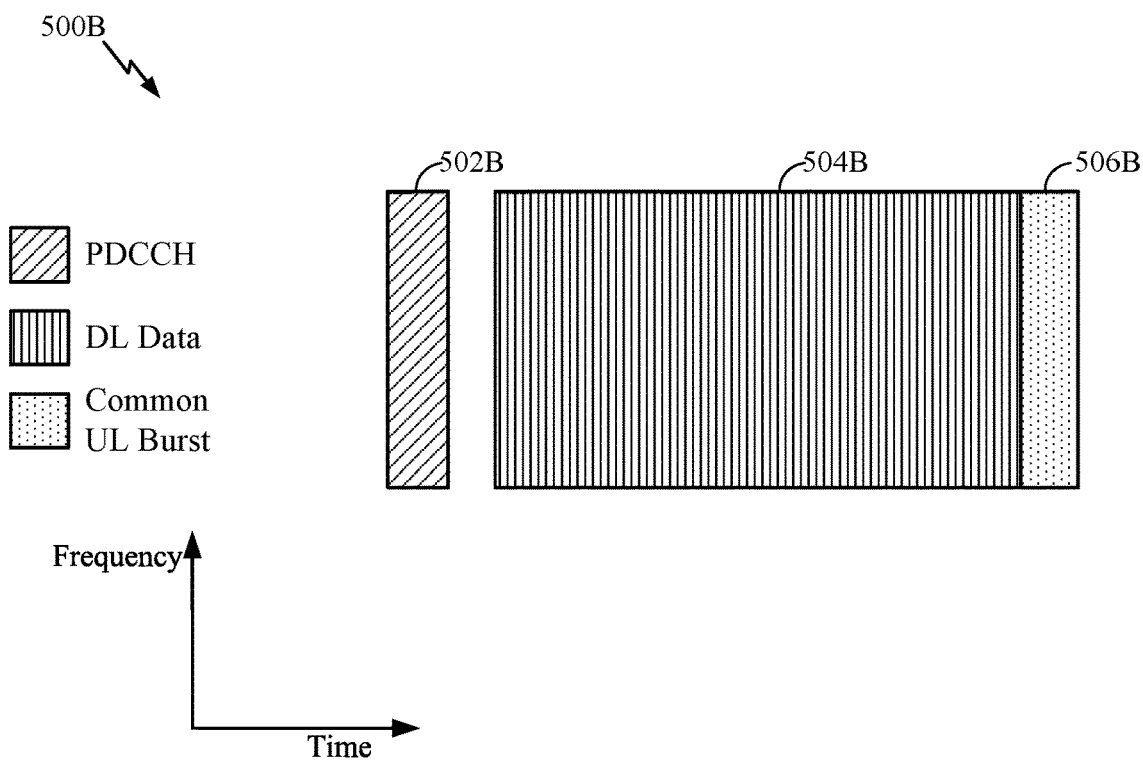
FIG. 5B is a block diagram illustrating an example of a UL-centric subframe, in accordance with certain aspects of the present disclosure.

FIG. 5B is a diagram 500B showing an example of an UL-centric subframe. The UL-centric subframe may include a control portion 502B. The control portion 502B may exist in the initial or beginning portion of the UL-centric subframe. The control portion 502B in FIG. 5B may be similar to the control portion 502A described above with reference to FIG. 5A. The UL-centric subframe may also include an UL data portion 504B. The UL data portion 504B may sometimes be referred to as the payload of the UL-centric subframe. The UL portion may refer to the communication resources utilized to communicate UL data from the subordinate entity (e.g., UE) to the scheduling entity (e.g., UE or BS).

As illustrated in FIG. 5B, the end of the control portion 502B may be separated in time from the beginning of the UL data portion 504B. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric subframe may also include a common UL portion 506B. The common UL portion 506B in FIG. 5B may be similar to the common UL portion 506A described above with reference to FIG. 5A. The common UL portion 506B may additionally or alternatively include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

Example Communication of Multi-State DMRS and Single State Data

Communication systems may support multiple base stations (BSs) and multiple TCI state communication scenarios. Aspects and features described herein provide improved communication devices configured for wireless communication using multiple TCI states. Deployments can be implemented in a variety of manners.

In a multi-BS scenario, multiple BSs (e.g., such as two BSs/TRPs/panels) can transmit data to the same user equipment (UE). In some instances, data could belong to (e.g., be placed into or be part of) the same transport block (TB) or code block (CB) (e.g., same information bits but can be differently coded bits) or different TB (e.g., different information bits are sent from multiple BSs). For example, the data transmitted by the multiple BSs may be organized, and transmitted to the physical layer, in the same TB. As part of a channel-coding operation in the physical layer, a TB can be split into one or more constituent CBs. In one example, there can be multiple CBs per TB, and the data transmitted by the multiple BSs may belong to or be placed in different CBs throughout a single TB. In another example, the data transmitted by the multiple BSs may belong to or be placed in the same CB of a single TB. In some cases, interference on the physical layer may cause one or more CBs in the TB to become corrupted. However, to correctly receive the TB, it is sufficient to retransmit only the erroneous CBs of the TB instead of the entire TB. Thus, if all or a portion of the data transmitted by the multiple BSs is corrupted or is otherwise not received by the UE, only the erroneous CBs of the TB can be retransmitted to the UE instead of the entire TB, thereby consuming fewer time and frequency resources.

The UE receives the transmissions from the multiple BSs and decodes the transmissions accordingly. In some examples, the transmissions from the BSs are made at the same time (e.g., in the same slot, mini-slot, and/or in the same symbols), but across different resource blocks (RBs) and/or different layers.

Multiple BSs can exploit the spatial domain to perform spatial division multiplexing (SDM), beamforming, and transmit diversity. SDM may be used to transmit different streams of data, also referred to as layers, simultaneously on the same time-frequency resource. In some examples, the data streams may be transmitted to a single UE to increase data rate.

The number of layers and/or the modulation order of each BS can be the same or different. In some examples, the transmissions from the BSs can be at different times (e.g., in two consecutive mini-slots or slots). In some examples, certain transmissions from the multiple BSs are made at the same time, while other transmissions are made at different times.

Figure 6A:
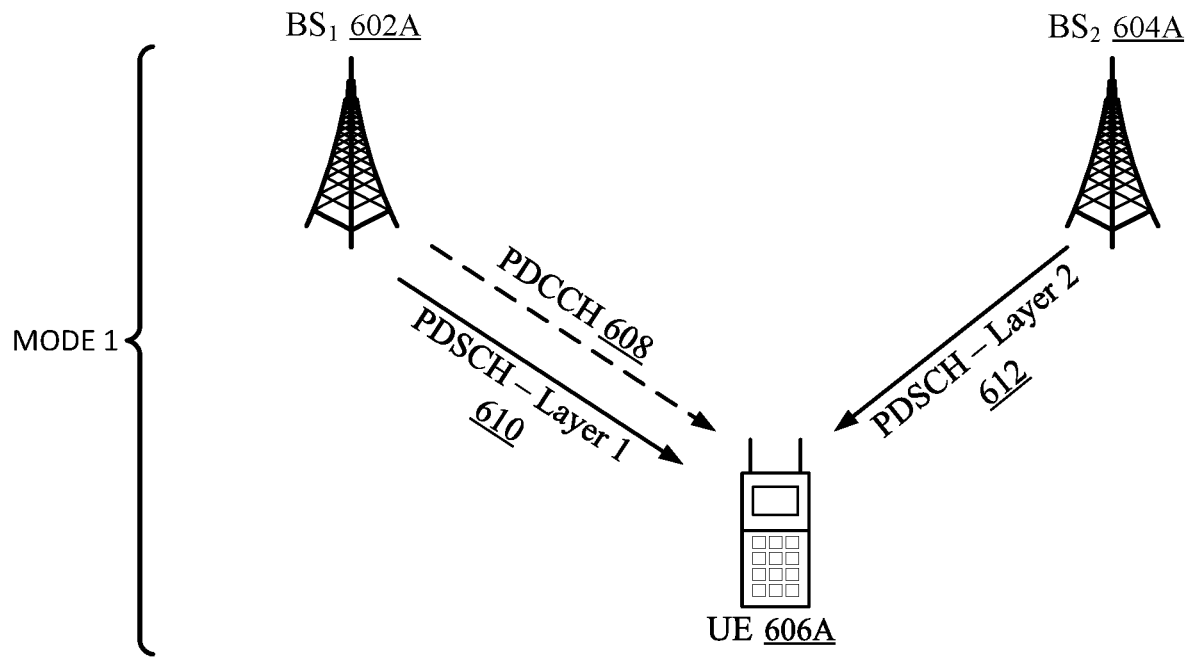
FIG. 6A is a diagram illustrating a first mode for multiple BS communication with a UE, in accordance with certain aspects of the present disclosure.
Figure 6B:
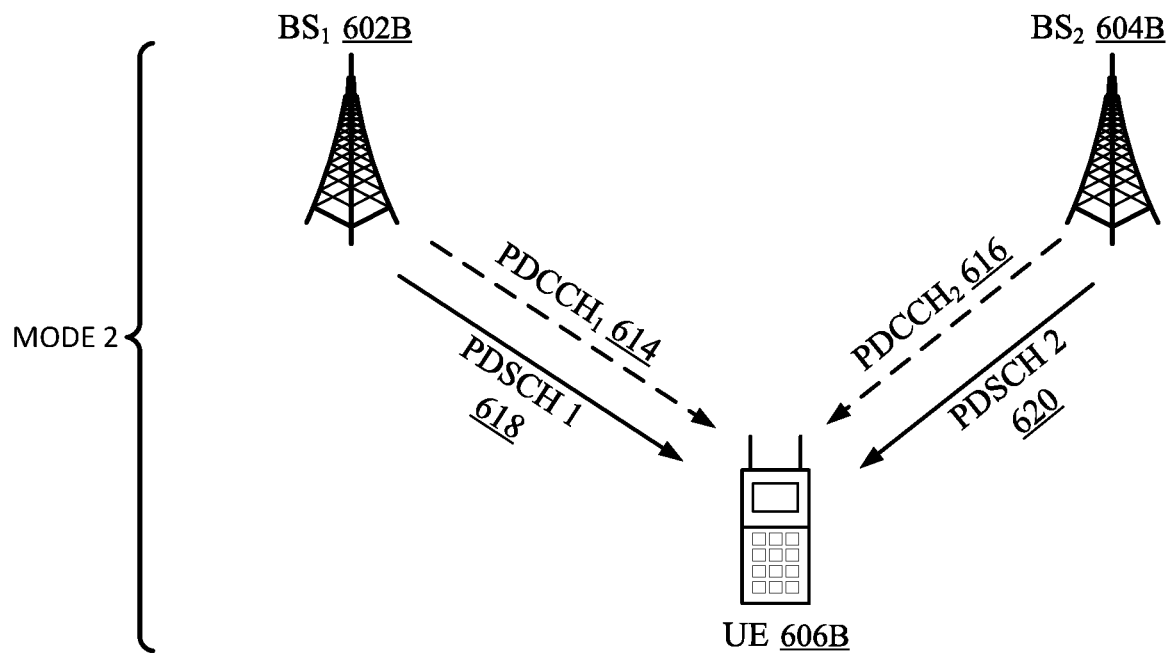
FIG. 6B is a diagram illustrating a second mode for multiple BS communication with a UE, in accordance with certain aspects of the present disclosure.

FIGS. 6A and 6B provide diagrams illustrating two example modes for multi-BS communication with a UE, according to certain aspects. In some instances, the modes may be deployed individually or operated in conjunction with each other. Further, there may additional operational modes apparent to those skilled in the art based on this disclosure.

In a first mode (Mode 1), a first BS (e.g., $BS_1$ 602A) utilizes a single PDCCH 608 for scheduling transmissions from multiple BSs (e.g., $BS_1$ 602A and $BS_2$ 604A) to a UE 606A over a single PDSCH. In this mode, each BS transmits data to the UE 606A using a different spatial layer (e.g., layer 1 610 and layer 2 612) of the PDSCH in overlapping RBs/symbols via SDM. For example, the multiple BSs may transmit in separate RBs (e.g., frequency division multiplexing (FDM)) and in different OFDM symbols (e.g., time division multiplexing (TDM)).

In a second mode (Mode 2), each of the multiple BSs (e.g., $BS_1$ 602B and $BS_2$ 604B) utilize a different PDCCH (e.g., $PDCCH_1$ 614 and $PDCCH_2$ 616) for scheduling UE 606B communication over a respective PDSCH (e.g., PDSCH 1 618 and PDSCH 2 620), as shown in FIG. 6B.

Accordingly, in the illustrated examples, multiple BSs (e.g., $BS_1$ 602A/B and $BS_2$ 604A/B) may communicate with the same UE (e.g., 606A/B) at the same time or at different times. As noted above, SDM may be used to increase data rate, however, it should also be noted that multiple BS communication with the same UE may improve reliability of a communication. For example, $BS_1$ 602A and $BS_2$ 604A may jointly transmit PDCCH/PDSCH/reference signals (e.g., DMRS) to the same UE 606A, ensuring that the UE 606A reliably receives the communication. Similarly, on the uplink, the UE may transmit PUCCH/PUSCH/reference signals (e.g., SRS) to each of the BSs.

In multi-BS scenarios, the multiple BSs may transmit control signaling (e.g., via the PDCCH 608 of Mode 1, or $PDCCH_1$ 614 and $PDCCH_2$ 616 of Mode 2) to a UE indicating one or more antenna ports and/or DMRS ports to the UE (e.g., UE 606A/B). In some examples, the control signaling is communicated via a downlink control information (DCI) message from one or more of the multiple BSs.

Alternatively, the control signaling may be communicated via a radio resource control (RRC) message. In some examples, if the control signaling includes an indication of an antenna port, the UE can determine corresponding DMRS ports using an entry in a look-up table that provides a mapping between the antenna port and one or more corresponding DMRS ports. In some examples, the DCI/RRC may indicate an antenna port via a value that corresponds to an entry in the look-up table containing the antenna port and the corresponding DMRS port.

FIG. 7A illustrates an example TCI state information element (IE) used to configure a DMRS port group of a UE via control signaling, in accordance with certain aspects of the present disclosure. In this example, the TCI state (IE) includes a TCI state identifier and a single quasi co-location (QCL) configuration having at least two types of QCL information (e.g., qcl-Type1 and qcl-Type2). Each of the two types of QCL information may provide the UE with a QCL assumption for a corresponding DL reference signals. For example, qcl-Type1 may provide the UE with a QCL assumption for a first reference signal, and qcl-Type2 may provide the UE with a QCL assumption for a second reference signal.

In some cases, a UE may be configured with a plurality of various TCI states (e.g., a plurality of TCI state IEs) indicated via RRC signaling. Then, the UE may receive a DCI having a field configured to indicate one or more of the TCI states that the UE will use for communication over PDSCH. For example, the one or more of the TCI states that will be used for PDSCH may be indicated by an N bit DCI field, where N is a non-zero integer (e.g., N=3). In other cases, the UE may be configured with a subset of the plurality of various TCI states (e.g., up to 8 TCI states) via MAC control signaling (e.g., a MAC control element (MAC-CE)), and downlink control signaling (e.g., DCI) may be used to select a TCI state out of the subset (e.g., 3 bits may be used to identify which TCI state is indicated).

FIG. 7B illustrates an example of a QCL information IE, in accordance with certain aspects of the present disclosure. The QCL assumptions may be grouped into different QCL types that correspond to parameters that may be assumed QCL'd for a set of QCL'd signals. For example, for a set of QCL'd signals, Type A may indicate that Doppler shift, Doppler spread, average delay, delay spread can be assumed QCL'd, while Type B may indicate only Doppler shift and Doppler spread, Type C may indicate a still different set of parameters (e.g., average delay, delay spread). In some cases, spatial QCL assumptions may be indicated, for example, by Type D that may indicate a spatial parameter. Spatial QCL may mean that a transmit beam or a receive beam selected based on a certain signal measurement may be applied to the QCL related signal. As an example, the QCL assumptions may provide a QCL relationship between a DMRS and at least one of a channel state information reference signal (CSI-RS) or a synchronization signal (SS). As used herein, a set of QCL'd signals refers to the QCL relationship between those signals (e.g., Doppler shift, Doppler spread, average delay, and/or delay spread).

Figure 8:
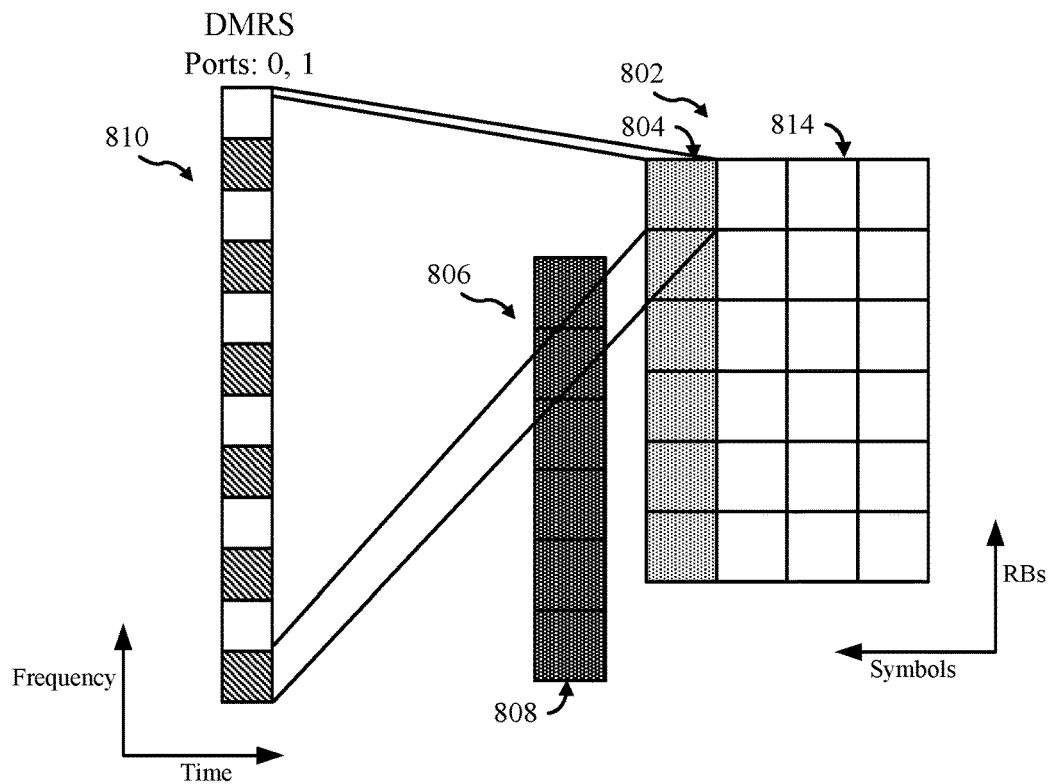
FIG. 8 is block diagram illustrating an example of multi-TCI state DMRS and single TCI-state data at different DMRS ports, in accordance with certain aspects of the present disclosure.
Figure 8:
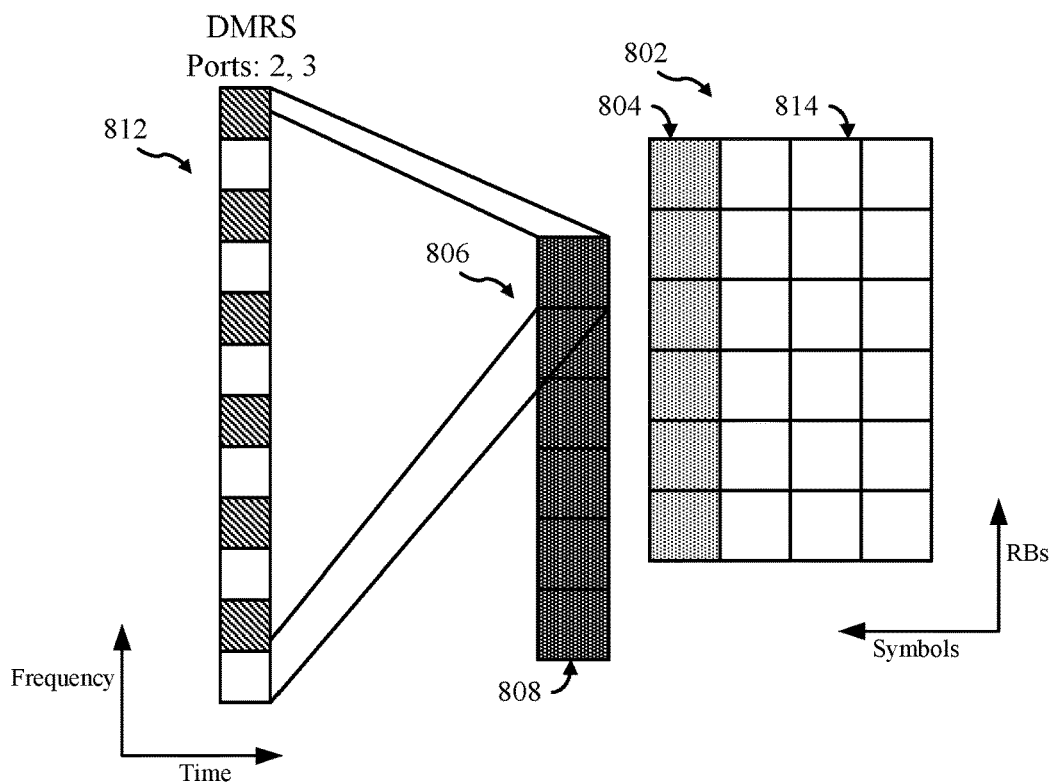

FIG. 8 is block diagram illustrating an example of multi-TCI state DMRS and single TCI-state data at different DMRS ports. For example, FIG. 8 shows an example data spatial layer 802 and an example DMRS spatial layer 806. The data spatial layer 802 includes a DMRS region 804 configured to communicate a DMRS signal, and a data region 814 configured to communicate data. In this example, the data spatial layer 802 corresponds to DMRS ports 0 and 1, which also carry data as a two-layer transmission (e.g., a first DMRS layer and a first data layer corresponding to DMRS port 0, and a second DMRS layer and a second data layer corresponding to DMRS port 1). Further, in this example, the DMRS spatial layer 806 corresponds to DMRS ports 2 and 3, which do not carry data.

In certain aspects, the number of spatial layers correspond to the number of ports used for data transmission. The DMRS ports in one RB and one symbol (e.g., DMRS region 804, 808) for DMRS type 1 with one DMRS symbol are shown, though other configurations are within the scope of this disclosure. For example, other DMRS types (e.g., mapping types, etc.), configurations (e.g., DMRS downlink configurations, etc.), and positions (e.g., type position and/or additional positions, etc.) are contemplated and within the scope of this disclosure.

In certain aspects, one or more DMRS ports may correspond to a code division multiplexed (CDM) group or frequency division multiplexed (FDM) group in each RB. For example, as shown in FIG. 8, a first DMRS port group 810 associated with one RB of the data spatial layer 802 may correspond to DMRS ports 0 and 1 which are within a first CDM group and associated with a first TCI state (for PDSCH)/SpatialRelationInfo (also referred to herein as "spatial relationship") (for PUSCH), while a second DMRS port group 812 associated with one RB of the DMRS spatial layer 806 may correspond to DMRS ports 2 and 3 which are within a second CDM group and associated with a second TCI state (for PDSCH)/SpatialRelationInfo (for PUSCH). That is, each DMRS port group may be associated with one of multiple TCI states. In this example, the second DMRS port group (DMRS ports 2 and 3) does not correspond to data layers. That is, in this particular example there are 4 DMRS ports, but only 2 data layers; other port and layer values may also be desired and/or utilized.

In certain aspects, each DMRS port may be characterized by one of multiple spatialRelationInfos. For example, certain aspects a BS may transmit parameter called spatialRelationInfo to a UE. Here, the spatialRelationInfo parameter may indicate a reference signal for the UE to use in UL transmissions. The reference signal may be an SSB-index, CSI-RS-ResourceId, or SRS-ResourceId. The BS may configure the spatialRelationInfo specific to the UE, and transmit the spatialRelationInfo to the UE via RRC signaling. In some examples, the UE may use the reference signal indicated by the spatialRelationInfo parameter for PUCCH and SRS.

Thus, in certain aspects, a BS (e.g., serving gNB) can communicate signaling to a UE, where the signaling is configured to indicate the DMRS ports that have multiple TCI states and/or spatialRelationInfo parameters. In some example, the BS may communicate signaling to the UE indicating a subset of the DMRS ports that are used for data transmission. In such an example, channel quality can be determined for multiple TCI states and/or spatialRelationInfos prior to scheduling a PDSCH and/or a PUSCH data communication. For example, the UE can measure channel quality based on DMRS received for multiple TCI states and transmit a channel quality indicator (CQI) report to the BS. For example, this feedback may be used by the BS for future scheduling (e.g., if one TCI state is weak relative to another TCI state, the BS will use the other, relatively stronger TCI state). Accordingly, the BS can configure the TCI state scheduling to be more reliable based on UE feedback of the multiple TCI states.

In certain aspects, TCI state feedback is based on the DMRS received by the UE. For example, the CQI report is generated by the UE based on multiple TCI state DMRSs received over PDSCH.

In certain aspects, a BS can measure channel quality based on a DMRS received from the UE for the case of PUSCH. In one example, the BS may transmit a particular DMRS to the UE in response to an uplink communication, where the particular DMRS is configured to provide the UE with an indication of uplink channel (e.g., PUSCH) quality.

Figure 9:
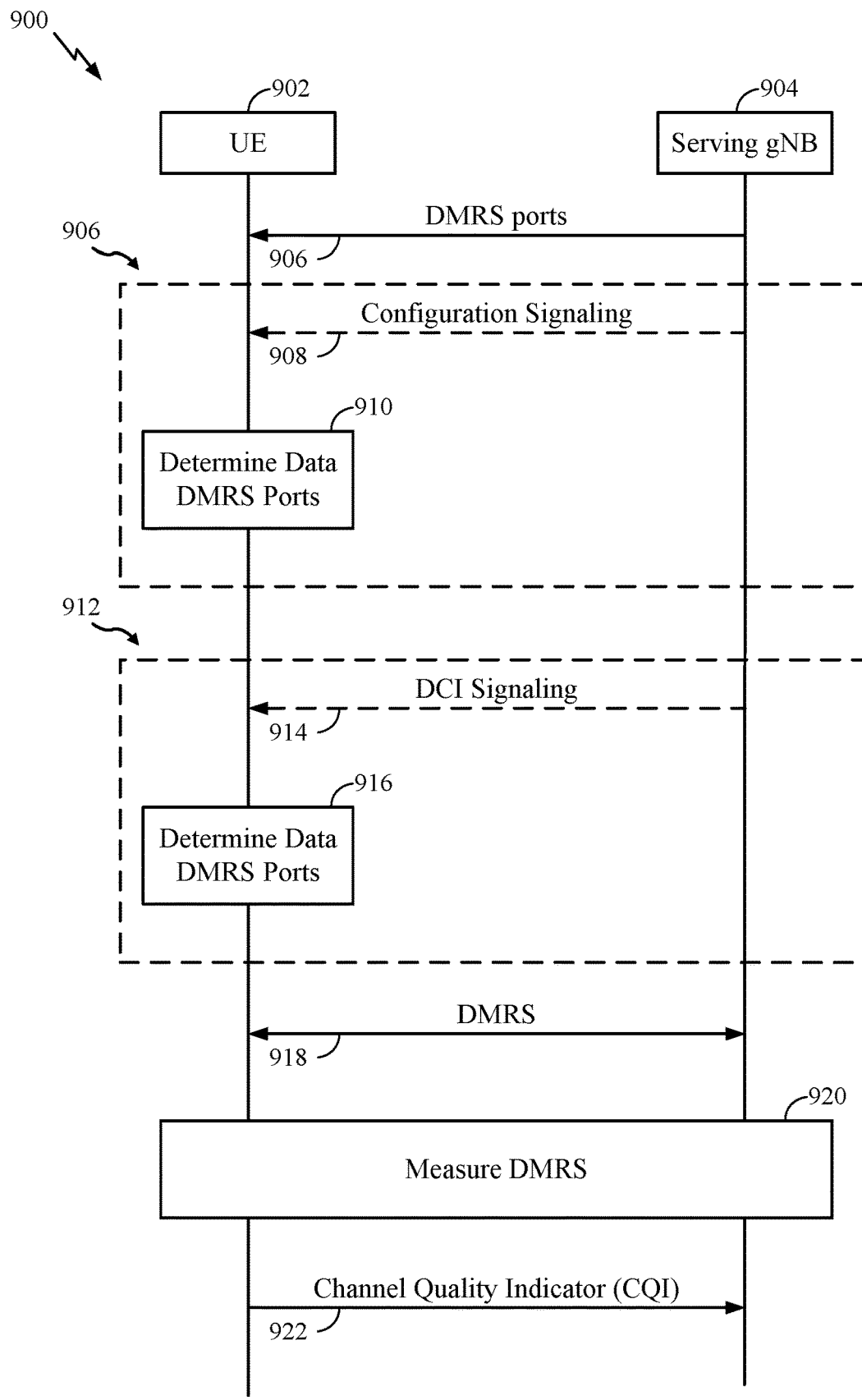
FIG. 9 is a call flow diagram illustrating example communications between a UE and a BS, in accordance with certain aspects of the present disclosure.

FIG. 9 is a call flow diagram 900 illustrating examples for signaling, by a BS (e.g., serving gNB 904), a subset of DMRS ports used for data transmission to a UE 902. Initially, the serving gNB 904 communicates a first signal 906 indicative of a plurality of DMRS ports. In a first example, the UE 902 may determine 910 a subset of the plurality of DMRS ports that are data DMRS ports based on a wireless communication standard rule or a network rule. These rules can provide operational guidelines determining if ports are used for data, control, on a combination thereof. For example, such a rule may provide that a subset of one or more DMRS ports of the plurality of DMRS ports are part of a first CDM group are used for data. Based on the rule, the UE 902 may identify which of the plurality of DMRS ports are part of the first CDM group. The DMRS ports that are part of the first CDM group may be configured to communicate data.

Alternatively, the gNB 904 may communicate configuration signaling 908 to the UE 902. The configuration signaling 908 can indicate a first and second spatial state (e.g., TCI states and/or spatialRelationInfos) of a physical channel. The first spatial state can correspond to a first subset of the plurality of DMRS ports, and the second spatial state can correspond to a second subset of the plurality of DMRS ports.

The configuration signaling 908 may have additional and other various attributes. In one example, the configuration signaling 908 may be configured to identify which one or more CDM groups are used for data communication. In one example, the configuration signaling 908 may be an RRC message configured to indicate to the UE 902 one or more CDM groups that correspond to the subset of the plurality of DMRS ports. In this example, the UE 902 may use the RRC message to determine which of the plurality of DMRS ports identified in the RRC message correspond to the one or more CDM groups used for data (e.g., the first subset of the plurality of DMRS ports) and which are not used for data (e.g., the second subset of the plurality of DMRS ports).

The configuration signaling 908 may be conveyed in a number of manners. In another example, the gNB 904 may communicate configuration signaling 908 to the UE 902 in a DCI message. Similarly, the DCI message may be configured to identify which one or more CDM groups are used for data communication. In this example, the UE 902 may use the DCI message to determine which of the plurality of DMRS ports correspond to the one or more CDM groups identified in the DCI message and used for data.

Communications between UEs and BSs may also include control signaling. In a second example 912, the UE 902 may receive, from the gNB 904, DCI signaling 914 indicating a first correspondence between a first spatial state (e.g., a TCI state and/or a spatialRelationInfo) and a first subset of the plurality of DMRS ports, and a second correspondence between a second spatial state (e.g., another TCI state and/or spatialRelationInfo) and a second subset of the plurality of DMRS ports. In certain aspects, the DCI signaling 914 may indicate which one of the first spatial state and the second spatial state the UE will use for communicating (e.g., transmitting and/or receiving) data. In this example, the UE 902 may determine 916 which of the plurality of DMRS ports are used for data, and which are not.

Similarly, the UE 902 may receive from the gNB 904, DCI signaling 914. This DCI signaling 914 may indicate or be indicative the plurality of DMRS ports are used for data communication. In this example, the UE 902 may determine 916 which of the plurality of DMRS ports identified in the DCI message the UE 902 will use for data communications, and which the UE 902 will not use for data communications.

In certain aspects, the UE 902 and BS 904 may exchange DRMS signals 918. The UE 902 may measure 920 a received DMRS and transmit a CQI report 922 based on the measured signal. In some examples, a CQI report 922 may be generated based on a DMRS transmitted using DMRS ports having a first TCI state. In another example, the report may be generated based on data communicated from the BS using the DMRS ports having the first TCI state.

In certain aspects, UE 902 may generate a CQI report 922. This CQI report 922 may be based on a DMRS transmitted using DMRS ports having a second TCI state. In another example, the report may be generated based on data communicated from the BS using the DMRS ports having the second TCI state. The UE 902 may then transmit the CQI report 922 to the BS 904.

In certain aspects, UE 902 measures 920 multiple received DMRSs and transmit a CQI report 922 based on measurements of all the received DMRSs. For example, the UE 902 may generate a CQI report 922 based on measurements of all the DMRS ports, including the first TCI state and the second TCI state. In such an example, the CQI report 922 may contain information corresponding to inter-layer interference between multiple spatial layers. The UE 902 may then transmit the CQI report 922 to the BS 904.

Similarly, the BS 904 may measure 920 a DMRS signal 918 received from the UE 902. Based on the measurements, the BS 904 may transmit a CQI report 922 to the UE based on the measured signal. In some examples, the CQI report 922 is a DMRS signal that is indicative of channel quality feedback, and the UE 902 can use to determine uplink channel quality.

Figure 10:
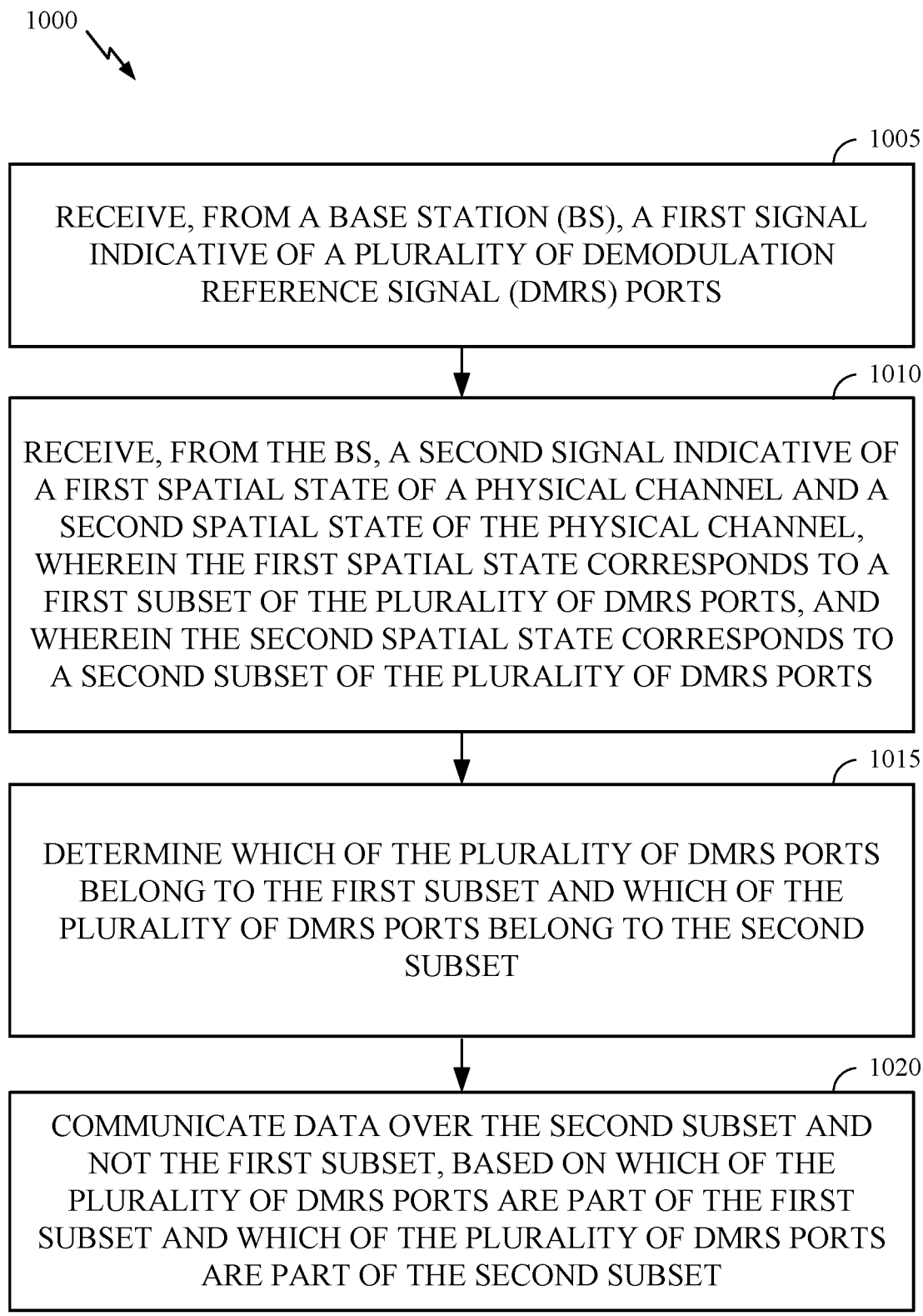
FIG. 10 is a flow diagram illustrating example operations for wireless communication by a UE, in accordance with certain aspects of the present disclosure.

FIG. 10 is a flow diagram illustrating example operations 1000 for wireless communication, in accordance with certain aspects of the present disclosure. The operations 1000 may be performed, for example, by a UE (e.g., such as a UE 120a in the wireless communication network 100). Operations 1000 may be implemented as software components that are executed and run on one or more processors (e.g., controller/processor 280 of FIG. 2). Further, the transmission and reception of signals by the UE in operations 1000 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 1000 may begin, at block 1005, by receiving, from a base station (BS), a first signal. This first signal can be indicative of a plurality of demodulation reference signal (DMRS) ports.

The operations 1000 may proceed to block 1010 by receiving, from the BS, a second signal. This second signal can be indicative of a first spatial state of a physical channel and a second spatial state of the physical channel. The first spatial state can correspond to a first subset of the plurality of DMRS ports. And the second spatial state can correspond to a second subset of the plurality of DMRS ports.

The operations 1000 may proceed to block 1015 where further DMRS port consideration may take place. This additional consideration can include determining which of the plurality of DMRS ports are part of the first subset and which of the plurality of DMRS ports are part of the second subset.

The operations 1000 may proceed to block 1020 by communicating data over the second subset and not the first subset, based on which of the plurality of DMRS ports are part of the first subset and which of the plurality of DMRS ports are part of the second sub set.

The operations 1000 may include additional aspects, such as any single aspect or any combination of aspects described below and/or in connection with one or more other operations described elsewhere herein.

In a first aspect, the first signal includes a downlink control information (DCI) message comprising a field configured to identify one or more of the plurality of DMRS ports.

In a second aspect, alone or in combination with the first aspect, the second signal includes a downlink control information (DCI) message comprising a field configured to identify one or both of the first spatial state and the second spatial state.

In a third aspect, alone or in combination with one or more of the first and second aspects, each of the first spatial state and the second spatial state correspond to one of a plurality of transmission configuration indicator (TCI) states of a physical downlink shared channel (PDSCH), or one of a plurality of spatial relationship states of a physical uplink shared channel (PUSCH).

In a fourth aspect, alone or in combination with one or more of the first through third aspects, the second subset of the plurality of DMRS ports correspond to a set of layers of the physical channel.

In a fifth aspect, alone or in combination with one or more of the first through fourth aspects, the operations 1000 further comprise receiving downlink control information (DCI). This DCI can indicate a number of items. These items can include, but are not limited to, (i) a first correspondence between the first spatial state and the first subset of the plurality of DMRS ports, (ii) a second correspondence between the second spatial state and the second subset of the plurality of DMRS ports, and (iii) which one of the first spatial state and the second spatial state the UE will use for communicating data.

In a sixth aspect, alone or in combination with one or more of the first through fifth aspects, the operations 1000 may further comprise identifying which of the plurality of DMRS ports correspond to a first code division multiplexed (CDM) group of a plurality of CDM groups, wherein DMRS ports corresponding to the first CDM group are configured to communicate data.

In a seventh aspect, alone or in combination with one or more of the first through sixth aspects, the operations 1000 may further comprise configuring the first CDM group to identify the second subset of the plurality of DMRS ports based on a wireless communication standard or network implementation.

In an eighth aspect, alone or in combination with one or more of the first through seventh aspects, the operations 1000 further comprise receiving radio resource control (RRC) signaling. This RRC signaling can be indicative of one or more code division multiplexed (CDM) groups that correspond to the second subset of the plurality of DMRS ports. Determining which of the plurality of DMRS ports are part of the first subset and which of the plurality of DMRS ports are part of the second subset comprises determining which of the plurality of DMRS ports correspond to the one or more CDM groups.

In a ninth aspect, alone or in combination with one or more of the first through eighth aspects, the operations 1000 further comprise receiving downlink control information (DCI) signaling. This DCI signally can be indicative of one or more code division multiplexed (CDM) groups that correspond to the second subset of the plurality of DMRS ports. Determining which of the plurality of DMRS ports are part of the first subset and which of the plurality of DMRS ports are part of the second subset comprises determining which of the plurality of DMRS ports correspond to the one or more CDM groups.

In a tenth aspect, alone or in combination with one or more of the first through ninth aspects, the operations 1000 further comprise receiving downlink control information (DCI) signaling indicative of which of the plurality of DMRS ports are part of the second subset.

In an eleventh aspect, alone or in combination with one or more of the first through tenth aspects, the operations 1000 further comprise receiving, from the BS, (i) a first DMRS transmitted over the physical channel using the first subset of the plurality of DMRS ports, and (ii) a second DMRS and data transmitted over the physical channel using the second subset of the plurality of DMRS ports.

In a twelfth aspect, alone or in combination with one or more of the first through eleventh aspects, the operations 1000 further comprise measuring one or more of: a first channel quality based on the second DMRS or a second channel quality based on the data.

In a thirteenth aspect, alone or in combination with one or more of the first through twelfth aspects, the operations 1000 further comprise measuring a first channel quality based on the first DMRS.

In a fourteenth aspect, alone or in combination with one or more of the first through thirteenth aspects, the operations 1000 further comprise measuring: a first channel quality based on the first DMRS, and a second channel quality based on the second DMRS.

In a fifteenth aspect, alone or in combination with one or more of the first through fourteenth aspects, the operations 1000 further comprise measuring a first channel quality based on the first DMRS, a second channel quality based on one of the second DMRS or the data, a third channel quality based on both of the first DMRS and the second DMRS.

In a sixteenth aspect, alone or in combination with one or more of the first through fifteenth aspects, the operations 1000 further comprise transmitting one or more of the measurements to the BS.

In a seventeenth aspect, alone or in combination with one or more of the first through sixteenth aspects, the operations 1000 further comprise measuring one or more of: a first channel quality based on the first DMRS or the second DMRS; or a second channel quality based on the data; and transmitting one or more of the measurements to the BS.

In an eighteenth aspect, alone or in combination with one or more of the first through seventeenth aspects, the operations 1000 further comprise measuring one or more of: a first channel quality based on the first DMRS, and a second channel quality based on one of the second DMRS or the data; or a third channel quality based on both of the first DMRS and the second DMRS; and transmitting one or more of the measurements to the BS.

In a nineteenth aspect, alone or in combination with one or more of the first through eighteenth aspects, the first signal includes a first downlink control information (DCI)

message comprising a field configured to identify one or more of the plurality of DMRS ports, and the second signal includes a second downlink control information (DCI) message comprising a field configured to identify one or both of the first spatial state and the second spatial state.

Although FIG. 10 shows example blocks of operations 1000, in some aspects, the operations 1000 may include additional blocks, fewer blocks, different blocks, or differently arranged blocks than those depicted in FIG. 10. Additionally, or alternatively, two or more of the blocks of the operations 1000 may be performed in parallel.

Figure 11:
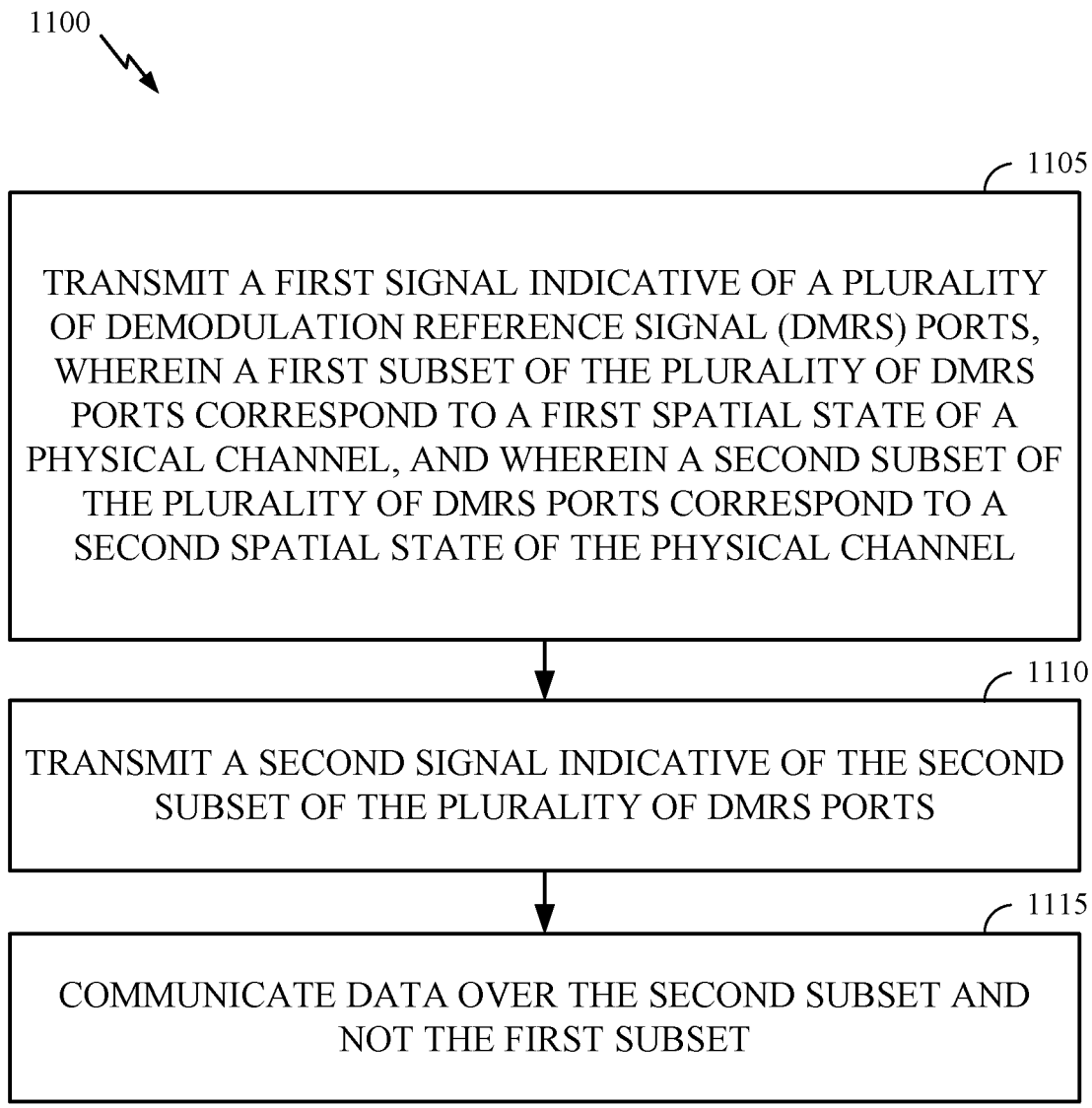
FIG. 11 is a flow diagram illustrating example operations for wireless communication by a BS, in accordance with certain aspects of the present disclosure.

FIG. 11 is a flow diagram illustrating example operations 1100 for wireless communication, in accordance with certain aspects of the present disclosure. The operations 1100 may be performed, for example, by a BS (e.g., such as the BS 110a in the wireless communication network 100). Operations 1100 may be implemented as software components that are executed and run on one or more processors (e.g., controller/processor 240 of FIG. 2). Further, the transmission and reception of signals by the BS in operations 1100 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

The operations 1100 may begin, at block 1105, by transmitting a first signal indicative of a plurality of demodulation reference signal (DMRS) ports. A first subset of the plurality of DMRS ports correspond to a first spatial state of a physical channel. And a second subset of the plurality of DMRS ports correspond to a second spatial state of the physical channel.

The operations 1100 may proceed to block 1110, by transmitting a second signal indicative of the second subset of the plurality of DMRS ports.

The operations 1100 may proceed to block 1115, by communicating data over the second subset and not the first subset.

Operations 1100 may include additional aspects, such as any single aspect or any combination of aspects described below and/or in connection with one or more other operations described elsewhere herein.

In a first aspect, the second signal comprises a radio resource configuration (RRC) message indicative of one or more code division multiplexed (CDM) groups that correspond to the second subset of the plurality of DMRS ports.

In a second aspect, alone or in combination with the first aspect, the second signal comprises downlink control information (DCI) signaling indicative of one or more code division multiplexed (CDM) groups that correspond to the second subset of the plurality of DMRS ports.

In a third aspect, alone or in combination with one or more of the first and second aspects, the second signal comprises downlink control information (DCI) indicating: (i) a first correspondence between the first spatial state and the first subset of the plurality of DMRS ports, (ii) a second correspondence between the second spatial state and the second subset of the plurality of DMRS ports, and (iii) which one of the first spatial state and the second spatial state the BS will use for communicating data.

In a fourth aspect, alone or in combination with one or more of the first through third aspects, the second signal comprises downlink control information (DCI) signaling indicative of which of the plurality of DMRS ports are part of the second subset.

Although FIG. 11 shows example blocks of operation 1100, in some aspects, operations 1100 may include additional blocks, fewer blocks, different blocks, or differently arranged blocks than those depicted in FIG. 11. Additionally, or alternatively, two or more of the blocks of operation 1100 may be performed in parallel.

Figure 12:
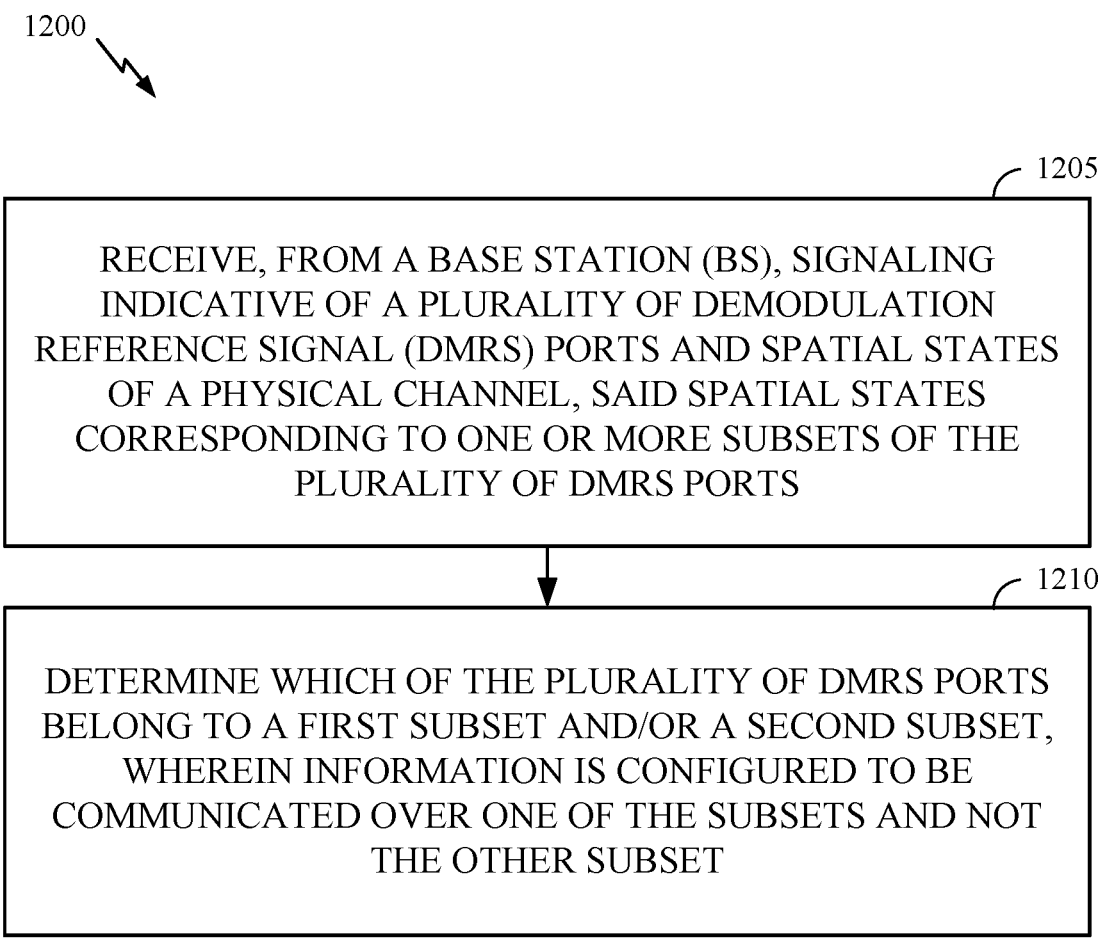
FIG. 12 is a flow diagram illustrating example operations for wireless communication by a UE, in accordance with certain aspects of the present disclosure.

FIG. 12 is a flow diagram illustrating example operations 1200 for wireless communication, in accordance with certain aspects of the present disclosure. The operations 1200 may be performed, for example, by a UE (e.g., such as a UE 120a in the wireless communication network 100). Operations 1200 may be implemented as software components that are executed and run on one or more processors (e.g., controller/processor 280 of FIG. 2). Further, the transmission and reception of signals by the UE in operations 1200 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 1200 may begin, at block 1205, by receiving, from a base station (B S), signaling indicative of a plurality of demodulation reference signal (DMRS) ports and spatial states of a physical channel, said spatial states corresponding to one or more subsets of the plurality of DMRS ports.

The operations 1200 may proceed to block 1210 by determining which of the plurality of DMRS ports are part of a first subset and/or a second subset, wherein information is configured to be communicated over one of the subsets and not the other sub set.

Operations 1200 may include additional aspects, such as any single aspect or any combination of aspects described below and/or in connection with one or more other operations described elsewhere herein. For example, in one additional aspect, the operations 1200 may further comprise communicating with the BS based on said determination of the DMRS ports.

Although FIG. 12 shows example blocks of operations 1200, in some aspects, the operations 1200 may include additional blocks, fewer blocks, different blocks, or differently arranged blocks than those depicted in FIG. 12. Additionally, or alternatively, two or more of the blocks of the operations 1200 may be performed in parallel.

Figure 13:
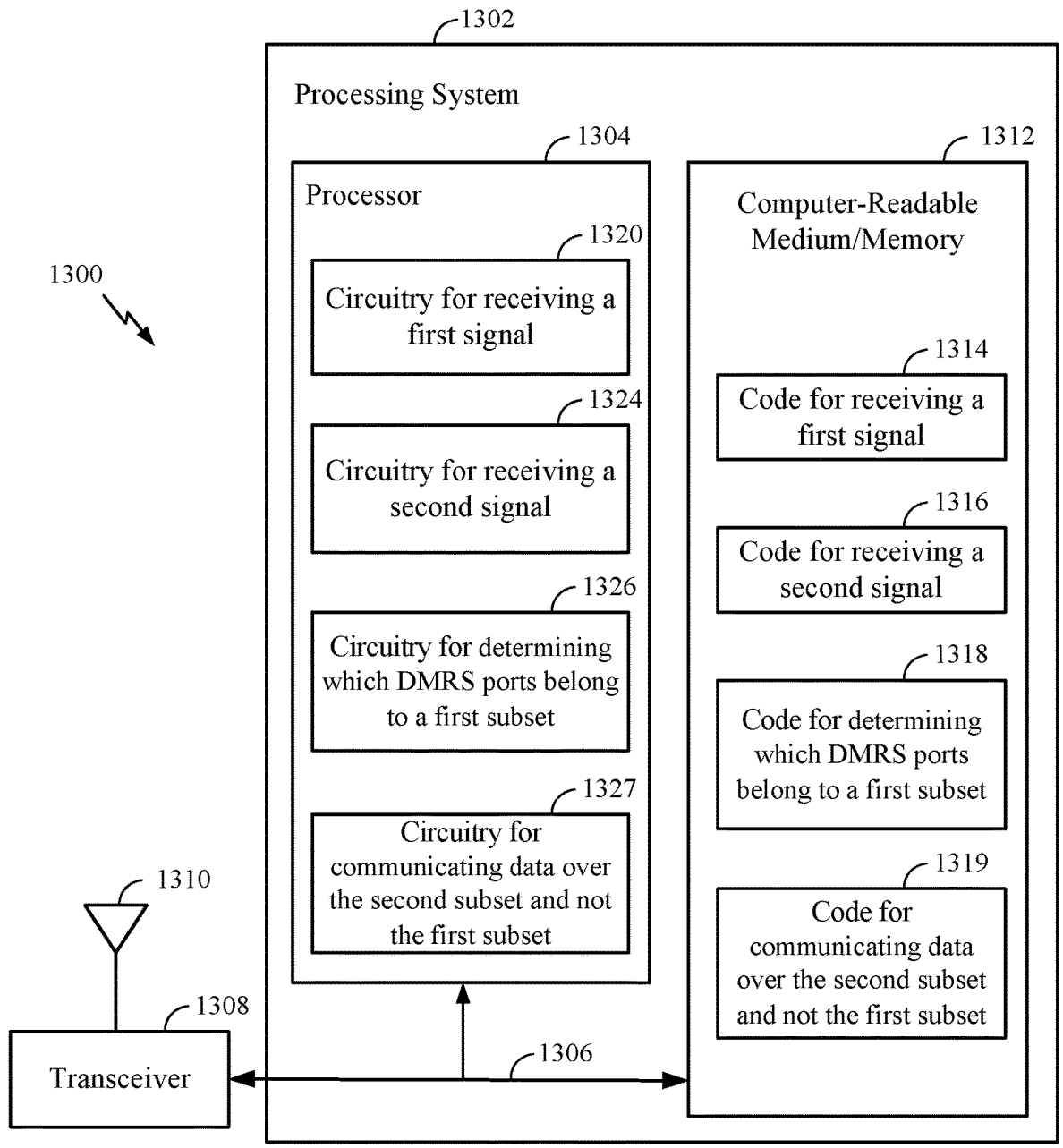
FIG. 13 is a block diagram illustrating a communications device that may include various components configured to perform operations for techniques disclosed herein in accordance with aspects of the present disclosure.

FIG. 13 illustrates a communications device 1300 that may include various components (e.g., corresponding to means-plus-function components) configured to perform operations for the techniques disclosed herein, such as the operations illustrated in FIG. 10. The communications device 1300 includes a processing system 1302 coupled to a transceiver 1308. The transceiver 1308 is configured to transmit and receive signals for the communications device 1300 via an antenna 1310, such as the various signals as described herein. The processing system 1302 may be configured to perform processing functions for the communications device 1300, including processing signals received and/or to be transmitted by the communications device 1300.

The processing system 1302 includes a processor 1304 coupled to a computer-readable medium/memory 1312 via a bus 1306. In certain aspects, the computer-readable medium/memory 1312 is configured to store instructions (e.g., computer-executable code) that when executed by the processor 1304, cause the processor 1304 to perform the operations illustrated in FIG. 10, or other operations for performing the various techniques discussed herein for providing joint channel feedback. In certain aspects, computer-readable medium/memory 1312 stores code 1314 for receiving, from a base station (BS), a first signal indicative of a plurality of demodulation reference signal (DMRS) ports; code 1316 for receiving, from the BS, a second signal indicative of a first spatial state of a physical channel and a second spatial state of the physical channel, wherein the first spatial state corresponds to a first subset of the plurality of DMRS ports, and wherein the second spatial state corresponds to a second subset of the plurality of DMRS ports; code 1318 for determining which of the plurality of DMRS ports are part of the first subset and which of the plurality of DMRS ports are part of the second subset, wherein data is communicated over the second subset and not the first subset; and code 1319 for communicating data over the second subset and not the first subset, based on which of the plurality of DMRS ports are part of the first subset and which of the plurality of DMRS ports are part of the second subset.

In certain aspects, the processor 1304 has circuitry configured to implement the code stored in the computer-readable medium/memory 1312. The processor 1304 includes circuitry 1320 for receiving, from a base station (BS), a first signal indicative of a plurality of demodulation reference signal (DMRS) ports; circuitry 1324 for receiving, from the BS, a second signal indicative of a first spatial state of a physical channel and a second spatial state of the physical channel, wherein the first spatial state corresponds to a first subset of the plurality of DMRS ports, and wherein the second spatial state corresponds to a second subset of the plurality of DMRS ports; circuitry 1326 for determining which of the plurality of DMRS ports are part of the first subset and which of the plurality of DMRS ports are part of the second subset, wherein data is communicated over the second subset and not the first subset; and circuitry 1327 for communicating data over the second subset and not the first subset, based on which of the plurality of DMRS ports are part of the first subset and which of the plurality of DMRS ports are part of the second subset.

Figure 14:
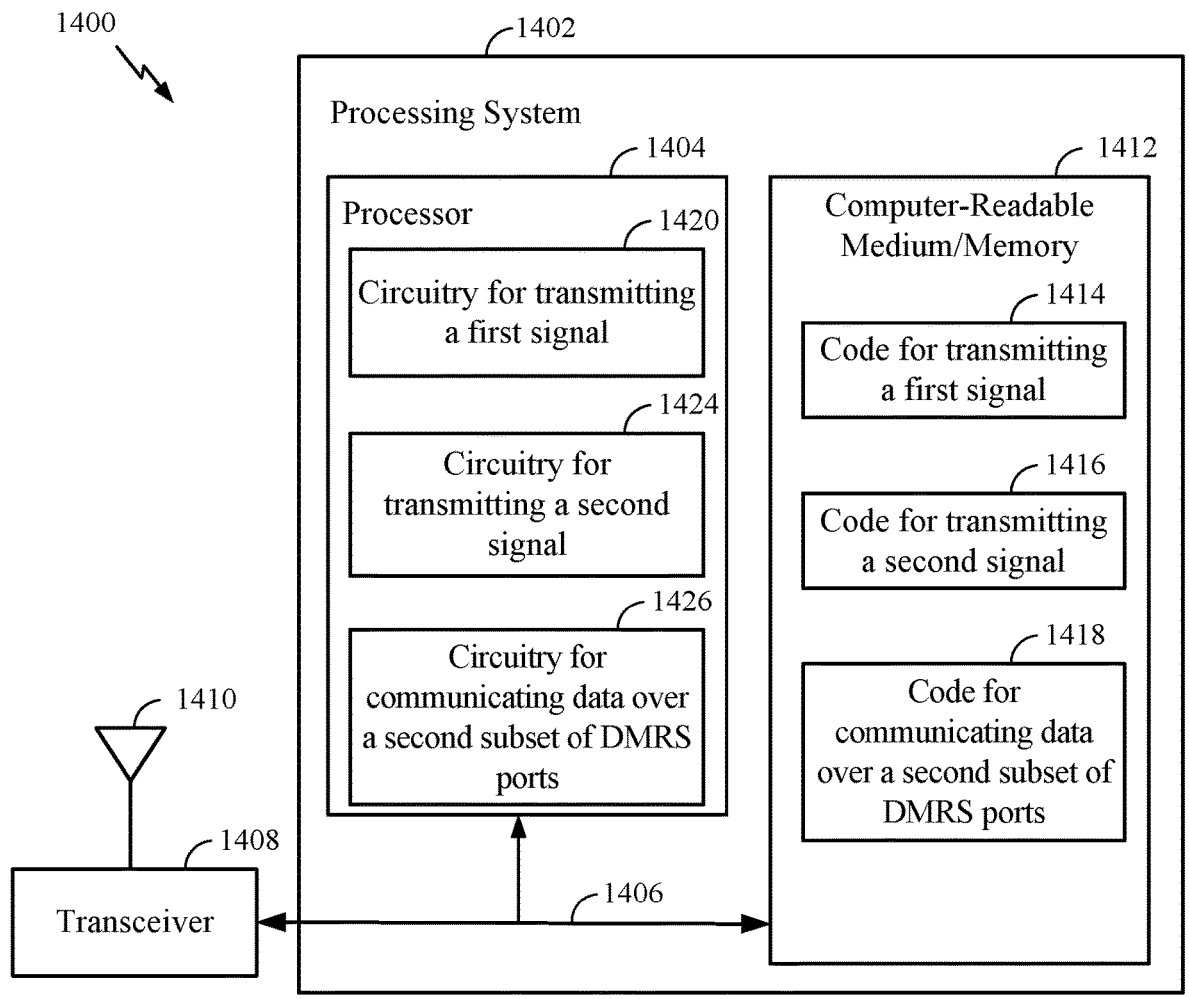
FIG. 14 is a block diagram illustrating a communications device that may include various components configured to perform operations for techniques disclosed herein in accordance with aspects of the present disclosure.

FIG. 14 illustrates a communications device 1400 that may include various components (e.g., corresponding to means-plus-function components) configured to perform operations for the techniques disclosed herein, such as the operations illustrated in FIG. 11. The communications device 1400 includes a processing system 1402 coupled to a transceiver 1408. The transceiver 1408 is configured to transmit and receive signals for the communications device 1400 via an antenna 1410, such as the various signals as described herein. The processing system 1402 may be configured to perform processing functions for the communications device 1400, including processing signals received and/or to be transmitted by the communications device 1400.

The processing system 1402 includes a processor 1404 coupled to a computer-readable medium/memory 1412 via a bus 1406. In certain aspects, the computer-readable medium/memory 1412 is configured to store instructions (e.g., computer-executable code) that when executed by the processor 1404, cause the processor 1404 to perform the operations illustrated in FIG. 11, or other operations for performing the various techniques discussed herein for providing joint channel feedback. In certain aspects, computer-readable medium/memory 1412 stores code 1414 for transmitting a first signal indicative of a plurality of demodulation reference signal (DMRS) ports, wherein a first subset of the plurality of DMRS ports correspond to a first spatial state of a physical channel, and wherein a second subset of the plurality of DMRS ports correspond to a second spatial state of the physical channel; code 1416 for transmitting a second signal indicative of the second subset of the plurality of DMRS ports; and code 1418 for communicating data over the second subset and not the first subset.

In certain aspects, the processor 1404 has circuitry configured to implement the code stored in the computer-readable medium/memory 1412. The processor 1404 includes circuitry 1420 for transmitting a first signal indicative of a plurality of demodulation reference signal (DMRS) ports, wherein a first subset of the plurality of DMRS ports correspond to a first spatial state of a physical channel, and wherein a second subset of the plurality of DMRS ports correspond to a second spatial state of the physical channel; circuitry 1424 for transmitting a second signal indicative of the second subset of the plurality of DMRS ports; and circuitry 1426 for communicating data over the second subset and not the first subset.

Figure 15:
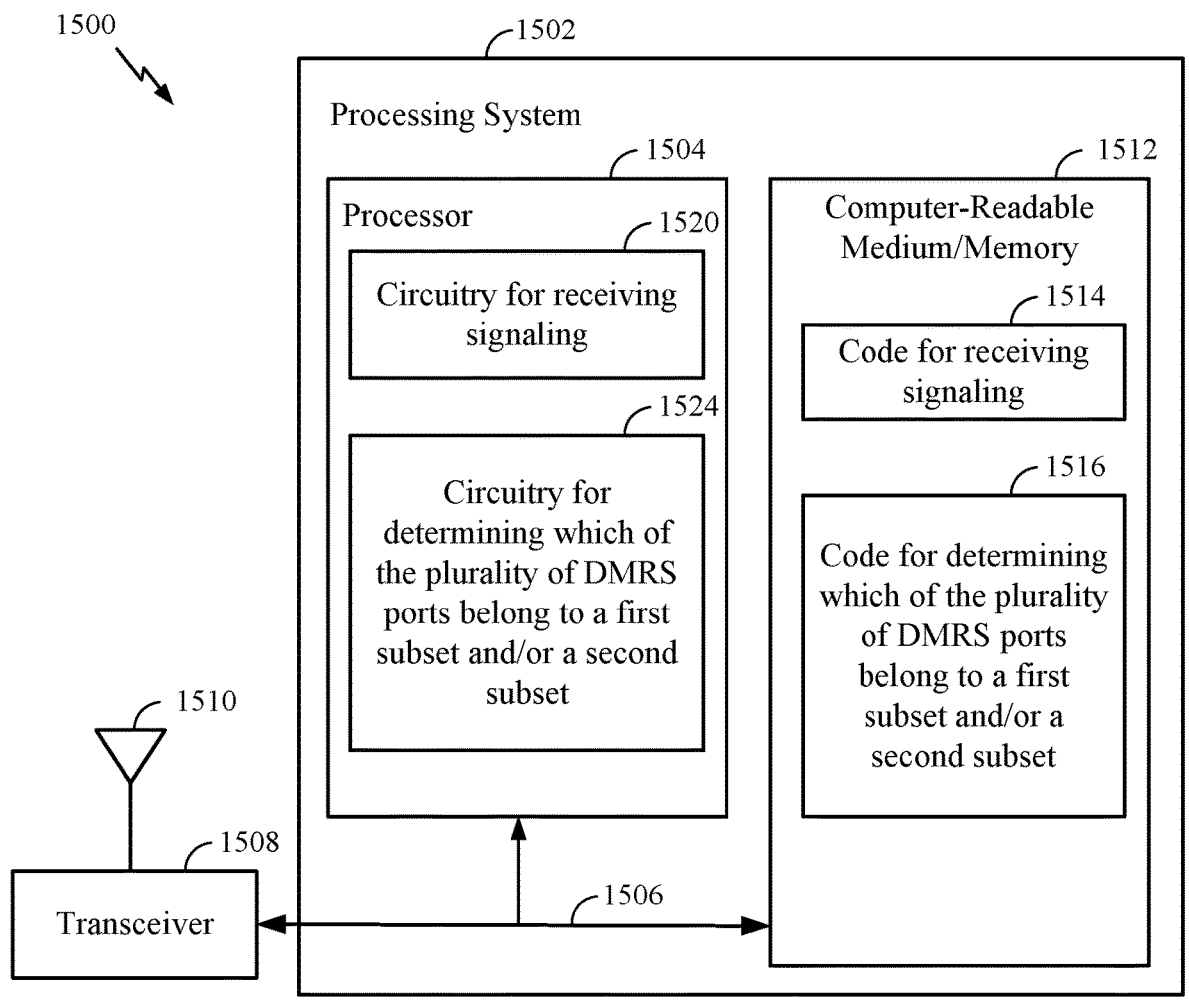
FIG. 15 is a block diagram illustrating a communications device that may include various components configured to perform operations for techniques disclosed herein in accordance with aspects of the present disclosure.

FIG. 15 illustrates a communications device 1500 that may include various components (e.g., corresponding to means-plus-function components) configured to perform operations for the techniques disclosed herein, such as the operations illustrated in FIG. 12. The communications device 1500 includes a processing system 1502 coupled to a transceiver 1508. The transceiver 1508 is configured to transmit and receive signals for the communications device 1500 via an antenna 1510, such as the various signals as described herein. The processing system 1502 may be configured to perform processing functions for the communications device 1500, including processing signals received and/or to be transmitted by the communications device 1500.

The processing system 1502 includes a processor 1504 coupled to a computer-readable medium/memory 1512 via a bus 1506. In certain aspects, the computer-readable medium/memory 1512 is configured to store instructions (e.g., computer-executable code) that when executed by the processor 1504, cause the processor 1504 to perform the operations illustrated in FIG. 12, or other operations for performing the various techniques discussed herein for providing joint channel feedback. In certain aspects, computer-readable medium/memory 1512 stores code 1514 for receiving, from a base station (B S), signaling indicative of a plurality of demodulation reference signal (DMRS) ports and spatial states of a physical channel, said spatial states corresponding to one or more subsets of the plurality of DMRS ports; and code 1516 for determining which of the plurality of DMRS ports are part of a first subset and/or a second subset, wherein information is configured to be communicated over one of the subsets and not the other sub set.

In certain aspects, the processor 1504 has circuitry configured to implement the code stored in the computer-readable medium/memory 1512. The processor 1504 includes circuitry 1520 for receiving, from a base station (BS), signaling indicative of a plurality of demodulation reference signal (DMRS) ports and spatial states of a physical channel, said spatial states corresponding to one or more subsets of the plurality of DMRS ports; and circuitry 1524 for determining which of the plurality of DMRS ports are part of a first subset and/or a second subset, wherein information is configured to be communicated over one of the subsets and not the other subset.

Additional Considerations

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. CDMA2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). NR is an emerging wireless communications technology under development.

The techniques described herein may be used for the wireless networks and radio technologies mentioned above as well as other wireless networks and radio technologies. For clarity, while aspects may be described herein using terminology commonly associated with 3G, 4G, and/or 5G wireless technologies, aspects of the present disclosure can be applied in other generation-based communication systems.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (e.g., 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe.

NR may utilize OFDM with a CP on the uplink and downlink and include support for half-duplex operation using time division duplex (TDD). In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 10, FIG. 11, and/or FIG. 12.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method of wireless communication at a user equipment (UE), comprising:
   receiving, from a base station (BS), a first signal indicative of a plurality of demodulation reference signal (DMRS) ports;
   receiving, from the BS, a second signal indicative of a first spatial state of a physical channel and a second spatial state of the physical channel, wherein the first spatial state corresponds to a first subset of the plurality of DMRS ports, and wherein the second spatial state corresponds to a second subset of the plurality of DMRS ports; and
   communicating data over the second subset and not the first subset, based on which of the plurality of DMRS ports are part of the first subset and which of the plurality of DMRS ports are part of the second subset.

2. The method of claim 1, wherein:
   the first signal includes a downlink control information (DCI) message comprising a field configured to identify one or more of the plurality of DMRS ports.

3. The method of claim 1, wherein
   the second signal includes a downlink control information (DCI) message comprising a field configured to identify one or both of the first spatial state and the second spatial state.

4. The method of claim 1, wherein:
   the first signal includes a first downlink control information (DCI) message comprising a first field configured to identify one or more of the plurality of DMRS ports; and
   the second signal includes a second DCI message comprising a second field configured to identify one or both of the first spatial state and the second spatial state.

5. The method of claim 1, wherein each of the first spatial state and the second spatial state correspond to:
   one of a plurality of transmission configuration indicator (TCI) states of a physical downlink shared channel (PDSCH); or one of a plurality of spatial relationship states of a physical uplink shared channel (PUSCH).

6. The method of claim 1, wherein the second subset of the plurality of DMRS ports correspond to a set of layers of the physical channel.

7. The method of claim 1, further comprising receiving downlink control information (DCI) indicating:
a first correspondence between the first spatial state and the first subset of the plurality of DMRS ports;
a second correspondence between the second spatial state and the second subset of the plurality of DMRS ports; and
which one of the first spatial state and the second spatial state the UE will use for communicating data.

8. The method of claim 1, further comprising:
identifying which of the plurality of DMRS ports correspond to a first code division multiplexed (CDM) group of a plurality of CDM groups, wherein DMRS ports corresponding to the first CDM group are configured to communicate data.

9. The method of claim 8, further comprising configuring the first CDM group to identify a subset of the plurality of DMRS ports over which data is communicated based on a wireless communication standard or network implementation.

10. The method of claim 1, further comprising receiving radio resource control (RRC) signaling indicative of one or more code division multiplexed (CDM) groups that correspond to a subset of the plurality of DMRS ports over which data is communicated, wherein determining which of the plurality of DMRS ports are part of the first subset and which of the plurality of DMRS ports are part of the second subset comprises determining which of the plurality of DMRS ports correspond to the one or more CDM groups.

11. The method of claim 1, further comprising receiving downlink control information (DCI) signaling indicative of one or more code division multiplexed (CDM) groups that correspond to the second subset of the plurality of DMRS ports, wherein determining which of the plurality of DMRS ports are part of the first subset and which of the plurality of DMRS ports are part of the second subset comprises determining which of the plurality of DMRS ports correspond to the one or more CDM groups.

12. The method of claim 1, further comprising receiving downlink control information (DCI) signaling indicative of which of the plurality of DMRS ports are part of the second subset.

13. The method of claim 1, further comprising receiving, from the BS:
a first DMRS transmitted over the physical channel using the first subset of the plurality of DMRS ports; and
a second DMRS and data transmitted over the physical channel using the second subset of the plurality of DMRS ports.

14. The method of claim 13, further comprising:
measuring one or more of:
a first channel quality based on the first DMRS or the second DMRS; or
a second channel quality based on the data; and
transmitting one or more of the measurements to the BS.

15. The method of claim 13, further comprising:
measuring one or more of:
a first channel quality based on the first DMRS, and a second channel quality based on one of the second DMRS or the data; or
a third channel quality based on both of the first DMRS and the second DMRS; and
transmitting one or more of the measurements to the BS.

16. A method of wireless communication at a base station (BS), comprising:
transmitting a first signal indicative of a plurality of demodulation reference signal (DMRS) ports, wherein a first subset of the plurality of DMRS ports correspond to a first spatial state of a physical channel, and wherein a second subset of the plurality of DMRS ports correspond to a second spatial state of the physical channel;
transmitting a second signal indicative of the second subset of the plurality of DMRS ports; and
communicating data over the second subset and not the first subset.

17. The method of claim 16, wherein the second signal comprises a radio resource configuration (RRC) message indicative of one or more code division multiplexed (CDM) groups that correspond to the second subset of the plurality of DMRS ports.

18. The method of claim 16, wherein the second signal comprises downlink control information (DCI) signaling indicative of one or more code division multiplexed (CDM) groups that correspond to the second subset of the plurality of DMRS ports.

19. The method of claim 16, wherein the second signal comprises downlink control information (DCI) indicating:
a first correspondence between the first spatial state and the first subset of the plurality of DMRS ports;
a second correspondence between the second spatial state and the second subset of the plurality of DMRS ports; and
which one of the first spatial state and the second spatial state the BS will use for communicating data.

20. The method of claim 16, wherein the second signal comprises downlink control information (DCI) signaling indicative of which of the plurality of DMRS ports are part of the second subset.

21. A user equipment (UE), comprising:
a memory; and
a processor communicatively coupled to the memory, wherein the processor is configured to:
receive, from a base station (BS), a first signal indicative of a plurality of demodulation reference signal (DMRS) ports;
receive, from the BS, a second signal indicative of a first spatial state of a physical channel and a second spatial state of the physical channel, wherein the first spatial state corresponds to a first subset of the plurality of DMRS ports, and wherein the second spatial state corresponds to a second subset of the plurality of DMRS ports; and
communicate data over the second subset and not the first subset, based on which of the plurality of DMRS ports are part of the first subset and which of the plurality of DMRS ports are part of the second subset.

22. The UE of claim 21, wherein:
the first signal includes a downlink control information (DCI) message comprising a field configured to identify one or more of the plurality of DMRS ports.

23. The UE of claim 21, wherein:
the second signal includes a downlink control information (DCI) message comprising a field configured to identify one or both of the first spatial state and the second spatial state.

24. The UE of claim 21, wherein:
- the first signal includes a first downlink control information (DCI) message comprising a field configured to identify one or more of the plurality of DMRS ports; and
- the second signal includes a second DCI message comprising a field configured to identify one or both of the first spatial state and the second spatial state.

25. The UE of claim 21, wherein each of the first spatial state and the second spatial state correspond to:
- one of a plurality of transmission configuration indicator (TCI) states of a physical downlink shared channel (PDSCH); or
- one of a plurality of spatial relationship states of a physical uplink shared channel (PUSCH).

26. The UE of claim 21, wherein the second subset of the plurality of DMRS ports correspond to a set of layers of the physical channel.

27. The UE of claim 21, wherein the processor is further configured to receive downlink control information (DCI) indicating:
- a first correspondence between the first spatial state and the first subset of the plurality of DMRS ports;
- a second correspondence between the second spatial state and the second subset of the plurality of DMRS ports; and
- which one of the first spatial state and the second spatial state the UE will use for communicating data.

28. The UE of claim 21, wherein the processor, being configured to determine which of the plurality of DMRS ports are part of the first subset and which of the plurality of DMRS ports are part of the second subset, is further configured to:
- identify which of the plurality of DMRS ports correspond to a first code division multiplexed (CDM) group of a plurality of CDM groups, wherein DMRS ports corresponding to the first CDM group are configured to communicate data.

29. The UE of claim 28, wherein the first CDM group is configured to identify a subset of the plurality of DMRS ports over which data is communicated based on a wireless communication standard or network implementation.

30. A base station, comprising:
- a memory; and
- a processor communicatively coupled to the memory, wherein the processor is configured to:
  - transmit a first signal indicative of a plurality of demodulation reference signal (DMRS) ports, wherein a first subset of the plurality of DMRS ports correspond to a first spatial state of a physical channel, and wherein a second subset of the plurality of DMRS ports correspond to a second spatial state of the physical channel;
  - transmit a second signal indicative of the second subset of the plurality of DMRS ports; and
  - communicate data over the second subset and not the first subset.

* * * * *